(12) United States Patent
Karli et al.

(10) Patent No.: US 11,436,777 B1
(45) Date of Patent: Sep. 6, 2022

(54) MACHINE LEARNING-BASED HAZARD VISUALIZATION SYSTEM

(71) Applicant: CoreLogic Solutions, LLC, Irvine, CA (US)

(72) Inventors: Matthew E. Karli, Austin, TX (US); Robert V. Fritchie, Erie, CO (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 17/169,333

(22) Filed: Feb. 5, 2021

Related U.S. Application Data

(60) Provisional application No. 62/971,784, filed on Feb. 7, 2020.

(51) Int. Cl.
| | |
|---|---|
| G06T 11/60 | (2006.01) |
| G06N 20/00 | (2019.01) |
| G06F 16/29 | (2019.01) |
| G06K 9/62 | (2022.01) |
| G06V 30/422 | (2022.01) |

(52) U.S. Cl.
CPC .......... *G06T 11/60* (2013.01); *G06F 16/29* (2019.01); *G06K 9/6256* (2013.01); *G06N 20/00* (2019.01); *G06V 30/422* (2022.01); *G06T 2200/24* (2013.01)

(58) Field of Classification Search
None
See application file for complete search history.

(56) References Cited

U.S. PATENT DOCUMENTS

| | | | |
|---|---|---|---|
| 9,947,202 B1* | 4/2018 | Moon | G06Q 50/265 |
| 11,275,989 B2* | 3/2022 | Tschernezki | G06N 3/082 |
| 2020/0132884 A1* | 4/2020 | Rothenberg | G06N 7/005 |
| 2020/0159397 A1* | 5/2020 | Tohidi | G06F 3/04847 |
| 2020/0357256 A1* | 11/2020 | Wright | G06N 20/00 |

* cited by examiner

*Primary Examiner* — Nurun Flora
(74) *Attorney, Agent, or Firm* — Knobbe Martens Olson & Bear LLP

(57) ABSTRACT

A hazard visualization system that can use artificial intelligence to identify locations at which hazards have occurred and a cause therein and to predict locations at which hazards may occur in the future is described herein. As a result, the hazard visualization system may reduce the likelihood of structural damage and/or loss of life that could otherwise occur due to natural disasters or other hazards. For example, the hazard visualization system can train an artificial intelligence model to predict the date, time, type, severity, path, and/or other conditions of a hazard that may occur at a geographic location. As another example, the hazard visualization system can train an artificial intelligence model to identify equipment or other infrastructure depicted in geographic images.

20 Claims, 9 Drawing Sheets

MACHINE LEARNING-BASED HAZARD VISUALIZATION SYSTEM

CROSS-REFERENCE TO RELATED APPLICATIONS

This application claims the benefit of U.S. Provisional Application No. 62/971,784, entitled "WEATHER VISUALIZATIONS AND MACHINE LEARNING" and filed on Feb. 7, 2020, which is hereby incorporated by reference herein in its entirety.

TECHNICAL FIELD

The present disclosure generally relates to a machine learning-based system that can identify infrastructure or events that may be affected by future hazard events and/or that can identify the cause of one or more hazards.

BACKGROUND

Structures may get damaged and/or loss of life may occur due to various environmental hazards, such as floods, storm surge, tornadoes, hurricanes, and/or other weather phenomena. For example, an environmental hazard can disrupt the transmission of electricity, cause pipeline equipment to leak, cause structural damage to buildings, disrupt an event (e.g., a sporting event, a concert, a wedding, etc.), and/or the like. In some cases, damage caused by an environment hazard may not be readily apparent and therefore may not be addressed, which can increase the severity of the damage. In other cases, an environmental hazard may occur without warning, which can increase the likelihood that damage and/or loss of life occurs.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a hazard visualization system for identifying a cause of a hazard. The hazard visualization system comprises memory storing computer-executable instructions. The hazard visualization system further comprises a hardware processor in communication with the memory, where the computer-executable instructions, when executed by the hardware processor, cause the hardware processor to: obtain hazard data; annotate a geographic map to indicate a location at which the hazard occurred using the hazard data; identify a portion of the geographic map at which the hazard occurred and satisfied a condition; apply the identified portion of the geographic map as an input to a trained machine learning model, where application of the identified portion of the geographic map as the input to the trained machine learning model causes the trained machine learning model to output an identification of a location of infrastructure in the identified portion of the geographic map; and determine that a cause of the hazard is the infrastructure identified in the identified portion of the geographic map.

The hazard visualization system of the preceding paragraph can include any sub-combination of the following features: where a geographic image depicts the geographic map, and where the identified portion of the geographic map comprises one or more pixels of the geographic image; where the computer-executable instructions, when executed, further cause the hardware processor to apply the one or more pixels of the geographic image as the input to the trained machine learning model, where application of the one or more pixels of the geographic image as the input to the trained machine learning model causes the trained machine learning model to output an identification of one or more second pixels of the geographic image that depict the infrastructure; where the computer-executable instructions, when executed, further cause the hardware processor to: obtain a plurality of geographic images each annotated to indicate a location of infrastructure, and train a machine learning model to identify infrastructure using the plurality of geographic images to form the trained machine learning model; where a first geographic image in the plurality of geographic images comprises a pixel marked to indicate that the pixel depicts a first type of the infrastructure; where the computer-executable instructions, when executed, further cause the hardware processor to: determine that the location of the infrastructure identified in the identified portion of the geographic map is within a threshold distance of the location at which the hazard occurred, and determine that the infrastructure identified in the identified portion of the geographic map caused the hazard in response to the determination that the location of the infrastructure identified in the identified portion of the geographic map is within the threshold distance of the location at which the hazard occurred; where the condition comprises that the hazard occurred a threshold number of times within a first time period; where the computer-executable instructions, when executed, further cause the hardware processor to determine that the infrastructure identified in the identified portion of the geographic map caused the hazard to occur the threshold number of times within the first time period in response to the determination that the location of the infrastructure identified in the identified portion of the geographic map is within the threshold distance of the location at which the hazard occurred; where the computer-executable instructions, when executed, further cause the hardware processor to: generate user interface data that, when processed by a user device, causes the user device to display a user interface that depicts the annotated geographic map, the location of the infrastructure identified in the identified portion of the geographic map, and a location of other infrastructure, and transmit the user interface data to the user device; where the user interface depicts a map file comprising a first layer, a second layer, and a third layer, where the first layer comprises the annotated geographic map, where the second layer comprises the location of the infrastructure identified in the identified portion of the geographic map, and where the third layer comprises the location of the other infrastructure; where the infrastructure comprises one of a radio tower, a transmission line, a pipeline, water mains, a transformer, or a light pole; and where the hazard comprises one of a hail event, a wind event, a flood, storm surge, a lightning strike, a tornado, a hurricane, an earthquakes, a mud slide, or a wildfire.

Another aspect of the disclosure provides a computer-implemented method for identifying a cause of a hazard. The computer-implemented method comprises: as implemented by one or more computing devices configured with specific computer-executable instructions, obtaining hazard data; annotating a geographic map to indicate a location at which the hazard occurred using the hazard data; identifying a portion of the geographic map at which the hazard occurred and satisfied a condition; applying the identified portion of the geographic map as an input to a trained machine learning model, where application of the identified portion of the geographic map as the input to the trained machine learning model causes the trained machine learning model to output an identification of a location of infrastructure in the identified portion of the geographic map; and determining that a cause of the hazard is the infrastructure identified in the identified portion of the geographic map.

The computer-implemented method of the preceding paragraph can include any sub-combination of the following features: where the computer-implemented method further comprises obtaining a plurality of geographic images each annotated to indicate a location of infrastructure, and training a machine learning model to identify infrastructure using the plurality of geographic images to form the trained machine learning model; where a first geographic image in the plurality of geographic images comprises a pixel marked to indicate that the pixel depicts a first type of the infrastructure; where determining that a cause of the hazard is the infrastructure identified in the identified portion of the geographic map further comprises: determining that the location of the infrastructure identified in the identified portion of the geographic map is within a threshold distance of the location at which the hazard occurred, and determining that the infrastructure identified in the identified portion of the geographic map caused the hazard in response to the determination that the location of the infrastructure identified in the identified portion of the geographic map is within the threshold distance of the location at which the hazard occurred; and where the computer-implemented method further comprises: generating user interface data that, when processed by a user device, causes the user device to display a user interface that depicts the annotated geographic map, the location of the infrastructure identified in the identified portion of the geographic map, and a location of other infrastructure, and transmitting the user interface data to the user device.

Another aspect of the disclosure provides non-transitory, computer-readable storage media comprising computer-executable instructions for identifying a cause of a hazard, where the computer-executable instructions, when executed by a computer system, cause the computer system to: obtain hazard data; annotate a geographic map to indicate a location at which the hazard occurred using the hazard data; identify a portion of the geographic map at which the hazard occurred and satisfied a condition; apply the identified portion of the geographic map as an input to a trained machine learning model, where application of the identified portion of the geographic map as the input to the trained machine learning model causes the trained machine learning model to output an identification of a location of infrastructure in the identified portion of the geographic map; and determine that a cause of the hazard is the infrastructure identified in the identified portion of the geographic map.

The non-transitory, computer-readable storage media of the preceding paragraph can include any sub-combination of the following features: where the computer-executable instructions further cause the computer system to: obtain a plurality of geographic images each annotated to indicate a location of infrastructure, and train a machine learning model to identify infrastructure using the plurality of geographic images to form the trained machine learning model; and where the computer-executable instructions further cause the computer system to: generate user interface data that, when processed by a user device, causes the user device to display a user interface that depicts the annotated geographic map, the location of the infrastructure identified in the identified portion of the geographic map, and a location of other infrastructure, and transmit the user interface data to the user device.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
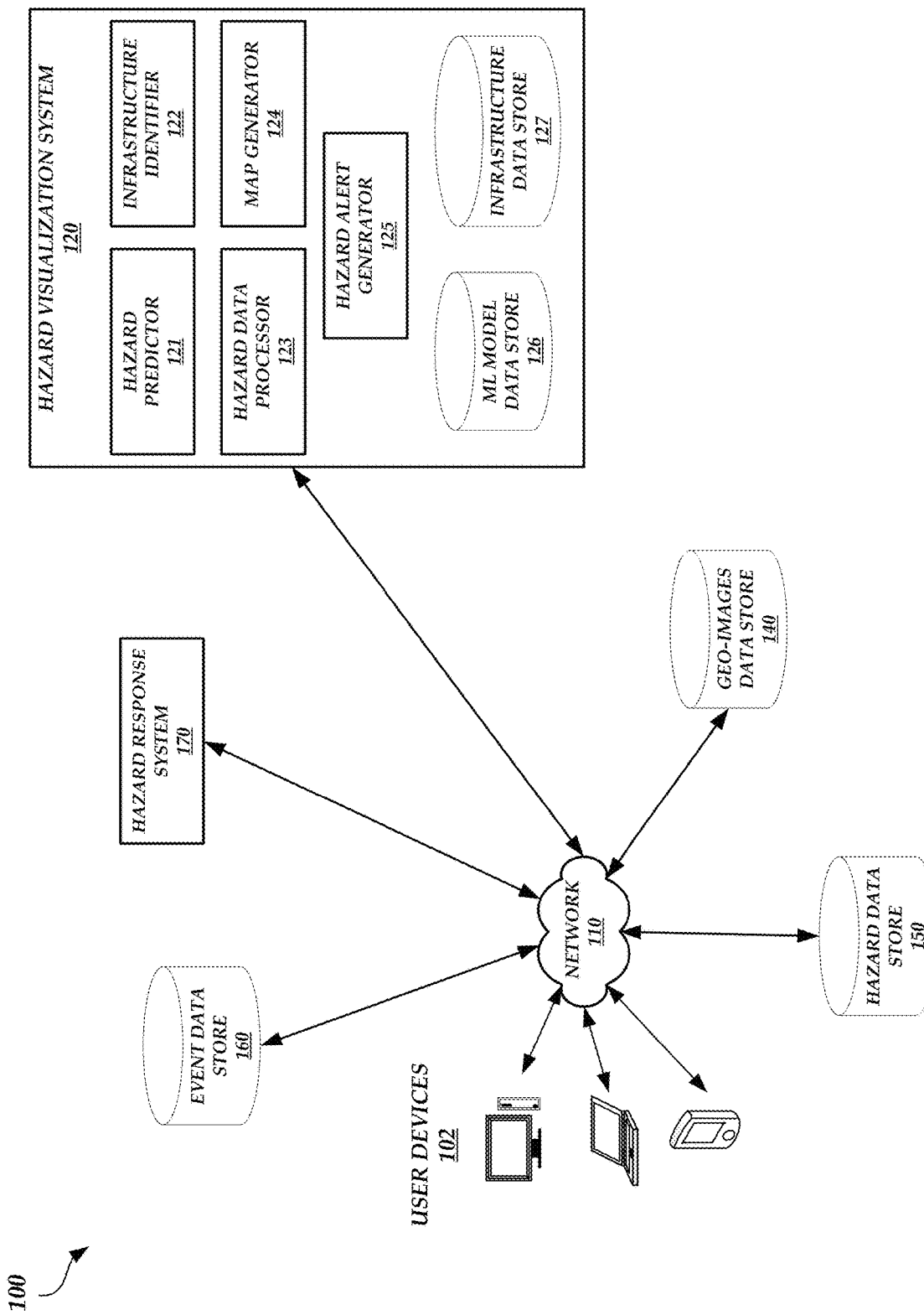
FIG. 1 is a block diagram of an illustrative operating environment in which a hazard visualization system predicts future hazards and/or determines the cause of hazards, annotating geographic maps to indicate the same.

As described above, structures may get damaged and/or loss of life may occur due to various environmental hazards, such as floods, storm surge, tornadoes, hurricanes, other weather phenomena, earthquakes, wildfires, and/or the like. In some cases, damage caused by an environment hazard may not be readily apparent and therefore may not be addressed, which can increase the severity of the damage and/or increase the chance of loss of life. For example, lightning may strike metallic equipment, such as a pipeline or a radio tower, during a storm. However, the lightning strike itself may occur quickly (e.g., within a second) and may not be observed by a human given the quickness of the strike. Lightning strikes can be problematic because such strikes can cause service disruption (e.g., cell phone, landline, or electricity service disruptions if striking a radio tower or transmission line tower) and/or can cause physical damage to equipment (e.g., a degradation in the structural integrity of the equipment, which can result in a leak if the equipment is a pipeline or a collapse of the equipment if the equipment is a tower and the strike occurs near a base of the tower) if the equipment is not inspected and/or repaired soon after the lightning strike. In fact, equipment of concern (e.g., radio towers, transmission line towers, pipelines, transformers, and/or other infrastructure equipment) is often located in remote areas. Thus, observation by a human of a lightning strike on the equipment may be even less likely given the quickness of the strike and the remote location of the equipment. As a result, damage to equipment by lightning strikes may go unnoticed and unchecked, which can exacerbate the extent of the damage and lead to additional problems including potential loss of life (e.g., due to falling debris, electrocution, etc.). The same may be true for other types of hazards, such as floods, earthquakes, fires, tornadoes, hurricanes, and/or the like.

In other cases, an environmental hazard may occur without warning, which can increase the likelihood that damage and/or loss of life occurs. For example, lightning may strike equipment randomly, an earthquake may occur at a location that happens to be at or near the site of equipment, heavy rains may cause a flash flood to occur at or near the site of equipment, and/or the like.

Identifying when and at which locations such hazards have occurred and/or predicting when and at which locations such hazards may occur can help reduce the likelihood of structural damage and/or loss of life. For example, knowing when a hazard occurred, how often a hazard occurs, where a hazard is likely to occur, when a hazard may occur, and/or the like could help a user determine when to inspect a site at which equipment may be present, where to deploy future equipment or other infrastructure (e.g., utility infrastructure, such as transmission lines, radio towers, transformers, water mains, light pole, etc.), the location(s) of existing equipment or other infrastructure that may pose a danger to technicians, equipment or other infrastructure that should be removed or moved, and/or the like, any of which may help reduce the likelihood of structural damage and/or loss of life.

Accordingly, described herein is a hazard visualization system that can use artificial intelligence to identify locations at which hazards have occurred and a cause therein and to predict locations at which hazards may occur in the future. As a result, the hazard visualization system may reduce the likelihood of structural damage and/or loss of life that could otherwise occur due to natural disasters or other hazards. For example, the hazard visualization system can train an artificial intelligence model (e.g., a machine learning model) to predict the date, time, type, severity, path, and/or other conditions of a hazard that may occur at a geographic location. The hazard visualization system can also obtain a geographic map and annotate the geographic map to indicate known location(s) of equipment or other infrastructure and/ or annotate the geographic map to indicate location(s) of the predicted hazard. In some embodiments, the hazard visualization system can further annotate the geographic map to indicate location(s) at which there is an intersection of equipment or other infrastructure and the predicted hazard. Thus, a user can use the annotated geographic map to determine when to inspect a site at which equipment may be present, where to deploy future equipment or other infrastructure (e.g., utility infrastructure, such as transmission lines, radio towers, transformers, water mains, light pole, etc.), the location(s) of existing equipment or other infrastructure that may pose a danger to technicians, equipment or other infrastructure that should be removed or moved, and/or the like.

As another example, the hazard visualization system can obtain hazard data that comprises characteristics of a hazard that has already occurred. The hazard visualization system can overlay a graphical representation of the hazard onto one or more geographic images depicting a geographic map using the hazard data, and can determine portion(s) of the geographic image(s) over which a graphical representation of the hazard is laid at which the hazard has a characteristic that satisfies a condition (e.g., a wind speed exceeds a threshold speed, water levels exceed a threshold height, earthquake magnitude exceeds a threshold magnitude, etc.). The hazard visualization system can separately train an artificial intelligence model (e.g., a machine learning model) to identify equipment or other infrastructure depicted in geographic images (e.g., satellite images or other aerial images that depict land below). The hazard visualization system can then apply the portion(s) of the geographic image(s) over which a graphical representation of the hazard is laid at which the hazard has a characteristic that satisfies a condition as an input to the trained artificial intelligence model, which may cause the trained artificial intelligence model to annotate the portion(s) or otherwise indicate location(s) within the portion(s) at which equipment or other infrastructure is identified. The hazard visualization system can then annotate a geographic map to indicate location(s) at which equipment or other infrastructure is identified. In some cases, equipment or other infrastructure may cause a hazard to occur and/or may cause a hazard to occur more often. As an illustrative example, a radio tower or pipeline may be constructed of a metal material, which may cause lightning strikes to occur and/or to occur more often at the location of the radio tower and/or pipeline. As another illustrative example, tall buildings (e.g., buildings having at least 5 stories, at least 10 stories, etc.) may cause wind tunnel effects, resulting in wind speeds that exceed a threshold speed more often at the location of the tall buildings and/or at location(s) between the tall buildings. As another illustrative example, transmission or power lines may spark wildfires when cut or disconnected. Thus, not only may the annotated geographic map indicate location(s) at which a hazard occurred and/or other characteristics of the hazard, but the annotated geographic map may also indicate location(s) of equipment and/or other infrastructure that may have caused the hazard to occur and/or to occur more frequently. As a result, a user can use the annotated geographic map to determine when to inspect a site at which equipment may be present, where to deploy future equipment or other infrastructure (e.g., utility infrastructure, such as transmission lines, radio towers, transformers, water mains, light pole, etc.), the location(s) of existing equipment or other infrastructure that may pose a danger to technicians, equipment or other infrastructure that should be removed or moved, and/or the like.

The hazard visualization system described herein does not merely automate operations that otherwise are performed by a human. For example, a human may identify on a map a location of equipment or other infrastructure to inspect and travel to the location to visually inspect the equipment or other infrastructure for damage. However, the human may not know when to travel to the location, whether a hazard actually affected the equipment or other infrastructure, where a hazard affected equipment or other infrastructure, or whether a hazard may affect the equipment or other infrastructure in the future. On the other hand, the hazard visualization system performs different operations to predict whether equipment or other infrastructure may be damaged in the future or to determine whether equipment or other infrastructure has likely been damaged based on a past hazard. For example, the hazard visualization system makes the prediction or determination using hazard data, geographic images, and artificial intelligence without using a visual, on-site inspection of the equipment or other infrastructure.

In addition, as described herein, the hazard visualization system can further use imagery to help a user determine how to act to reduce the likelihood of damage and/or loss of life. Unlike humans who process images via electrical signals sent from the optic nerve to the primary visual cortex in the brain, the hazard visualization system may use artificial intelligence to process the imagery to identify the location(s) of equipment and/or other infrastructure. For example, a machine learning model trained using a training set of images annotated with indications of location(s) of equipment and/or other infrastructure can be used to process current imagery to identify the location(s) of equipment and/or other infrastructure. Thus, the computing device(s) implementing the hazard visualization system may perform operations that are not and cannot be performed by a human by using artificial intelligence to identify the location(s) of equipment and/or other infrastructure in images. The computing device(s) implementing the hazard visualization system thereby uses artificial intelligence to improve the functionality of the computing device(s) itself.

Accordingly, the hazard visualization system described herein provides an improvement in computer-related technology (e.g., by allowing computing devices to produce more accurate predictions or determinations of hazards that may or have caused damage and/or loss of life and/or of the causes of such hazards) using specific techniques that are not used and cannot practically be used by humans.

In addition to the reasons discussed herein, the hazard visualization system described herein also improves the functionality of the computing device(s) that implements some or all of the functionality of the hazard visualization system described herein via artificial intelligence. For example, the hazard visualization system can use machine learning to process geographic images and/or to predict future hazards. Machine learning is a subset of artificial intelligence that iteratively learns from data without being explicitly programmed. Thus, a computing device configured to use a machine learning process to perform an action can learn how to perform the action without being explicitly programmed. Accordingly, the machine learning process improves the functionality of the computing device itself because the machine learning process allows the computing device to learn, and thereby produce more accurate annotations of images, without being explicitly programmed.

In general, a human does not use a machine learning process to perform any actions given that machine learning is a subset of artificial intelligence and humans use human or natural intelligence to perform actions, not artificial intelligence. It would be impractical for a human (or even a group of humans) to, for example, annotate one or more pixels of one or more images using a machine learning process without the use of a computer. For example, due to the fact that machine learning involves the iterative learning from data, a computing device that uses a machine learning process to perform an action is not programmed by a human with explicit instructions that cause the action to be performed. Rather, a computing device that uses a machine learning process to perform an action makes decisions or predictions in the course of performing the action based on a model learned or trained using sample data. Thus, there is not a known set of instructions that a human could simply follow to mimic the actions performed using a machine learning process.

Finally, the hazard visualization system described herein also provides an improvement in computer-related technology at least by producing an improved user interface. For example, the hazard visualization system can annotate a geographic map by overlaying different information in a manner as described above to indicate equipment or other infrastructure that may be located within a path or location of a predicted hazard and/or to indicate a cause of a hazard that has already occurred that may affect certain equipment and/or other infrastructure. The hazard visualization system can cause a user device to display the annotated geographic map in a user interface that allows a user to navigate the annotated geographic map and to add or remove layers that allows the user to visualize actions that can be taken to reduce the likelihood of damage occurring to equipment and/or other infrastructure and/or to reduce the likelihood of loss of life occurring. Thus, the user interface can display a variety of information within a single window, thereby allowing a user to improve or maintain the integrity of equipment or other infrastructure and/or to increase the likelihood that loss of life does not occur without requiring the user to navigate through different windows or tabs or to perform additional navigational steps.

While the present disclosure describes a hazard visualization system that can reduce the likelihood of structural and/or environmental damage and/or loss of life due to lightning strikes or tornadoes, this is not meant to be limiting. The hazard visualization system can use the same or similar techniques to reduce the likelihood of damage and/or loss of life that may be caused by any type of natural disaster or other hazard, such as a flood, hurricane, wind event, hail, snow, earthquake, wildfire, storm surge, volcanic eruption, mud flow, sea level change, etc.

Furthermore, while the present disclosure generally describes the hazard visualization system in the context of equipment or other infrastructure, this is not meant to be limiting. The same or similar operations described herein as being performed by the hazard visualization system can also be performed to predict when a hazard may affect an event (e.g., a sporting event, a concert, a wedding, and/or any other gathering that includes a threshold number of people) and/or to determine what equipment or other infrastructure may be causing a hazard to occur and/or a hazard to occur at a threshold frequency near or at an event so that appropriate evacuation measures or other actions can be taken to reduce the effects of the hazard on the event or the people attending. As one example, if the hazard visualization system predicts that a hazard may impact an event or that a hazard has impacted an event and/or has identified some object that may be exacerbating the effects of the event, the hazard visualization system can automatically transmit a notification or alert to a hazard response system (e.g., a 911 call center, a system run by an emergency response team, a system operated by organizers of the event, a system operated by a news organization, etc.) identifying the issue(s) so that appropriate action can be taken.

The foregoing aspects and many of the attendant advantages of this disclosure will become more readily appreciated as the same become better understood by reference to the following detailed description, when taken in conjunction with the accompanying drawings.

Example Hazard Visualization Environment

FIG. 1 is a block diagram of an illustrative operating environment 100 in which a hazard visualization system 120 predicts future hazards and/or determines the cause of hazards, annotating geographic maps to indicate the same. The operating environment 100 further includes a geo-images data store 140, a hazard data store 150, an event data store 160, and a hazard response system 170 that may each communicate with the hazard visualization system 120 via a network 110. Furthermore, the operating environment 100 includes various user devices 102 that may communicate with the hazard visualization system 120 to obtain annotated geographic maps that can be displayed in a user interface and that indicate predicted hazards, historical hazards, the location of equipment or other infrastructure, the location of event(s), an identification of equipment or other infrastructure that may cause a hazard or a hazard to occur more frequently, and/or the like.

The hazard visualization system 120 can be a computing system having memory storing computer-executable instructions and one or more hardware processors in communication with the memory, where the computer-executable instructions, when executed by the one or more hardware processors, cause the hardware processor(s) to predict future hazards, determine a cause of a historical hazard or a historical hazard occurring at a certain frequency, annotate geographic maps to indicate such information, and/or to perform other operations described herein. The hazard visualization system 120 may be a single computing device, or it may include multiple distinct computing devices, such as computer servers, logically or physically grouped together to collectively operate as a server system. The components of the hazard visualization system 120 can each be implemented in application-specific hardware (e.g., a server computing device with one or more ASICs) such that no software is necessary, or as a combination of hardware and software. In addition, the modules and components of the hazard visualization system 120 can be combined on one server computing device or separated individually or into groups on several server computing devices. In some embodiments, the hazard visualization system 120 may include additional or fewer components than illustrated in FIG. 1.

In some embodiments, the features and services provided by the hazard visualization system 120 may be implemented as web services consumable via the communication network 110. In further embodiments, the hazard visualization system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The hazard visualization system 120 may include various modules, components, data stores, and/or the like to provide the hazard prediction, hazard cause, and map annotation functionality described herein. For example, the hazard visualization system 120 may include a hazard predictor 121, an infrastructure identifier 122, a hazard data processor 123, a map generator 124, a hazard alert generator 125, a machine learning (ML) model data store 126, and an infrastructure data store 127.

The hazard predictor 121 can train a hazard prediction artificial intelligence model (e.g., a machine learning model, a neural network, etc.) to predict the date, time, type, location, severity, and/or other condition(s) of a future hazard. For example, the hazard predictor 121 can obtain historical hazard data from the hazard data store 150. Hazard data may include data corresponding to hazards like hail events, wind events, floods, storm surge, lightning strikes, tornadoes, hurricanes, other weather phenomena, earthquakes, wildfires, and/or other perils or natural disasters. For example, hail data may include, at specific geographic locations and times of a day and/or year, hail size, speed of the storm (e.g., wind speed), and/or direction of the storm (e.g., wind direction). Similarly, wind data may include, at specific geographic locations and times of a day and/or year, wind speed, wind direction, and/or maximum wind gusts. Flood data may include, at specific geographic locations and times of a day and/or year, water height, height of flood walls, rate of precipitation, and/or land elevation. Storm surge data may include, at specific geographic locations and times of a day and/or year, water height, height of flood walls, rate of precipitation, and/or land elevation. Lightning strike data may include the location of lightning strikes, times of a day and/or year at which lightning strikes occurred, the number of lightning strikes, storm speed, storm direction, and/or rate of precipitation. Tornado data may include the location of tornadoes, times of a day and/or year at which tornadoes occurred, the intensity of tornadoes, wind speed, tornado direction, amount of precipitation, and/or rate of precipitation. Hurricane data may include the location of hurricanes, times of a day and/or year at which hurricanes occurred, the intensity of hurricanes, wind speed, hurricane direction, atmospheric pressure, amount of precipitation, and/or rate of precipitation. Earthquake data may include a location of the earthquake epicenter, times of a day and/or year at which the earthquake occurred, the magnitude of the earthquake, the time length of the earthquake, the depth of the earthquake, the geology of the area surrounding the epicenter (including known fault lines), and/or data indicating where shaking was felt and the intensity of such shaking. Wildfire data may include a burn area, times of a day and/or year at which the wildfire occurred, outside air temperature, humidity, wind direction, intensity of the fire, and/or temperature of the fire. As described below, the hazard data can further include data indicating conditions during which no hazard has occurred at a particular geographic location.

The hazard predictor 121 can use the historical hazard data as training data, and train the hazard prediction artificial intelligence model using the historical hazard data. For example, the hazard predictor 121 may train a hazard prediction artificial intelligence model for a particular geographic location or area. To perform the training, the hazard predictor 121 can obtain historical hazard data that corresponds to the geographic location or area, and train the hazard prediction artificial intelligence model using this historical hazard data. In some embodiments, the historical hazard data used to train the hazard prediction artificial intelligence model may further include data indicating the conditions (e.g., temperature, wind speed, humidity, barometric pressure, cloud cover, etc.) at the geographic location or area at times during which no hazard occurred. Thus, the hazard predictor 121 can train the hazard prediction artificial intelligence model using hazard data that indicates characteristics of a hazard that occurred in a geographic location or area and hazard data that indicates characteristics or conditions that were present in the geographic location or area when no hazard occurred. As a result of the training, the hazard prediction artificial intelligence model may output a prediction of a hazard that may occur when presented with input data that includes a geographic location or area, a time of day, a time of year, current conditions at the geographic location or area (as may be indicated in current hazard data stored in the hazard data store 150), and/or the like.

The hazard predictor 121 can also use the trained hazard prediction artificial intelligence model to predict a future hazard. For example, a user device 102 may provide an indication of a geographic location or area and a time period (e.g., a future date and/or time) that is of interest. The hazard predictor 121 can optionally obtain current hazard data for the indicated geographic location or area (e.g., if the indicated time period is within a short time (e.g., a few hours, a day, a week, etc.) of a current time). The hazard predictor 121 can then apply the indicated geographic location, the indicated time period, and optionally the current hazard data as an input to a hazard prediction artificial intelligence model trained to predict a future hazard at the indicated geographic location. In response, the hazard prediction artificial intelligence model may output an indication of a hazard that may occur during the indicated time period, if any. The outputted indication may include a predicted type of hazard, a predicted location of the hazard, a predicted path of the hazard, a predicted severity of the hazard (e.g., category of hurricane or tornado, magnitude of earthquake, flood water level height, etc.), and/or other predicted conditions of the predicted hazard.

The map generator 124 can obtain a geographic map (e.g., locally or from the geo-images data store 140) and can annotate the geographic map to include an indication of the predicted hazard, such as the location, path, severity, or other conditions of the predicted hazard. Before, during, and/or after annotating the geographic map to include an indication of the predicted hazard, the map generator 124 can annotate the geographic map to include location(s) of equipment or other infrastructure within the indicated geographic location.

In some cases, a location of the predicted hazard and a location of equipment or other infrastructure may intersect. The map generator 124 can compare the predicted hazard and the location(s) of equipment or other infrastructure to identify such intersections. Optionally, the map generator 124 may further annotate the geographic map to indicate locations at which such intersections occur. In some embodiments, the map generator 124 may annotate the geographic map to indicate a location at which an intersection occurs if the intersection occurs at a location in which a severity of the hazard satisfies a particular condition (e.g., a category of hurricane or tornado is at least a certain category, a magnitude of an earthquake exceeds a threshold magnitude, a flood water level height exceeds a threshold height, etc.).

The map generator 124 may perform the annotations by adding different layers to the geographic map. For example, a background layer of the geographic map may include map or aerial imagery of a particular geographic location or area. Another layer that sits at least on top of the background layer may include an indication of the predicted hazard. Another layer that sits at least on top of the background layer may include location(s) of equipment or other infrastructure. Another layer that sits at least on top of the background layer may indicate location(s) at which a location of a hazard and a location of equipment or other infrastructure intersects (or a location of a hazard that has a characteristic satisfying a threshold condition and a location of equipment or other infrastructure intersects). The map generator 124 can generate a map file (or modify an existing map file) to include some or all of these layers and generate user interface data that references or embeds the map file such that the content of the map file can be displayed in a resulting user interface.

The map generator 124 can then transmit the user interface data to a user device 102, such as the user device 102 that indicates the geographic location and time period. The user interface data, when processed by the user device 102, may cause the user device 102 to render and display a user interface depicting the annotated geographic map (e.g., the different layers generated by the map generator 124). As described in greater detail below, the user interface may allow a user to hide or display any layer, to adjust the hierarchy of the layers (e.g., to select which layer sits on top of another layer), to change the colors of any layer, to the change the transparency of any layer, and/or the like. Thus, the user interface may provide a user with tools sufficient to allow the user to identify location(s) at which damage and/or loss of life is possible so that the user can take appropriate action (e.g., inspect a site at which equipment may be present, deploy future equipment or other infrastructure at a different location, notify technicians of location(s) of existing equipment or other infrastructure that may pose a danger to the technicians, move or remove equipment or other infrastructure, etc.).

The infrastructure identifier 122 can train an infrastructure identification artificial intelligence model (e.g., a machine learning model, a neural network, etc.) to identify equipment or other infrastructure in an image, such as an aerial image depicting land or terrain. For example, the infrastructure identifier 122 can use annotated geographic images (e.g., annotated aerial images) as training data, and train the infrastructure identification artificial intelligence model using the annotated geographic images. An annotated geographic image may be an aerial image in which one or more pixels of the aerial image are annotated, labeled, or otherwise marked to indicate the location and/or type of equipment or other infrastructure located at a geographic location corresponding to the pixel(s). As described herein, equipment or other infrastructure can include a radio tower (e.g., a television transmission tower, a cellular tower, etc.), a transmission line tower, a transformer, transmission lines, a pipeline, water mains, a light pole, a traffic light, a windmill, a solar panel, an oil rig, a gas line, and/or any other structure or equipment operated by a utility, municipality, or government or private entity. In some embodiments, equipment or other infrastructure can include buildings, stadiums, concert halls, outdoor venues, a parking lot, a parking structure, a pedestrian walkway, and/or any other type of structure or surface that can host an event, provide services for an event, or is otherwise manmade and used for an event.

To perform the training, the infrastructure identifier 122 can obtain annotated infrastructure data from the infrastructure data store 127, where the annotated infrastructure data includes the annotated geographic images, and perform the training using the annotated infrastructure data. In some embodiments, the annotated infrastructure data used to train the infrastructure identification artificial intelligence model may further include geographic images annotated to indicate that no equipment or infrastructure is present and/or annotated to indicate that other, natural objects are depicted therein (e.g., a river, a lake, a stream, an ocean, a levy, a tree, shrubs, sand, snow, rock, etc.). Thus, the infrastructure identifier 122 can train the infrastructure identification artificial intelligence model using annotated geographic images that identify equipment or other infrastructure and annotated geographic images that do not identify equipment or other infrastructure. As a result of the training, the infrastructure identification artificial intelligence model may output an indication of equipment or other infrastructure identified in a geographic image when presented with input data that includes the geographic image.

The infrastructure identifier 122 can also use the trained infrastructure identification artificial intelligence model to identify equipment or other infrastructure in a geographic image for use in determining a cause of a hazard. For example, the hazard data processor 123 can retrieve hazard data from the hazard data store 150 and one or more geographic images from the geo-images data store 140, where the hazard data and/or geographic images may be associated with a particular geographic location or area selected by a user via the user device 102. The hazard data may include an indication of a location at which one or more hazards occurred. In addition, each pixel of a geographic image may be associated with a particular geographic location. Thus, the hazard data processor 123 can analyze the hazard data and determine whether any of the indicated hazard location(s) matches a location associated with a portion (e.g., one or more pixels) of a geographic image. If the hazard data processor 123 identifies a match, then the infrastructure identifier 122 can obtain the portion of the geographic image at which a hazard occurred and apply the geographic image portion as an input to the trained infrastructure identification artificial intelligence model. As a result, the infrastructure identification artificial intelligence model may output an indication of a portion of the geographic image portion that depicts equipment or other infrastructure, if any.

The map generator 124 can obtain a geographic map (e.g., locally or from the geo-images data store 140) and can annotate the geographic map to include an indication of the hazard that occurred, such as the location, path, severity, or other conditions of the hazard. Before, during, and/or after annotating the geographic map to include an indication of the hazard, the map generator 124 can annotate the geographic map to include location(s) of known equipment or other infrastructure within the indicated geographic location. For example, the infrastructure data store 127 may store an indication of known locations of equipment or other infrastructure. The map generator 124 can obtain and annotate the geographic map with location(s) of known equipment or other infrastructure that is associated with a user or user device 102 that selected the particular geographic location or area. The map generator 124 can further annotate the geographic map to include an indication of the equipment or other infrastructure identified by the infrastructure identification artificial intelligence model (which may be equipment or other infrastructure unknown to the user, such as equipment or other infrastructure owned or operated by a third party entity separate from the user).

The map generator 124 may perform the annotations by adding different layers to the geographic map. For example, a background layer of the geographic map may include map or aerial imagery of a particular geographic location or area. Another layer that sits at least on top of the background layer may include an indication of the hazard. Another layer that sits at least on top of the background layer may include location(s) of known equipment or other infrastructure. Another layer that sits at least on top of the background layer may indicate location(s) of equipment or other infrastructure identified by the infrastructure identification artificial intelligence model. The map generator 124 can generate a map file (or modify an existing map file) to include some or all of these layers and generate user interface data that references or embeds the map file such that the content of the map file can be displayed in a resulting user interface.

The map generator 124 can then transmit the user interface data to a user device 102, such as the user device 102 that provides a selection of a geographic location or area. The user interface data, when processed by the user device 102, may cause the user device 102 to render and display a user interface depicting the annotated geographic map (e.g., the different layers generated by the map generator 124). As described in greater detail below, the user interface may allow a user to hide or display any layer, to adjust the hierarchy of the layers (e.g., to select which layer sits on top of another layer), to change the colors of any layer, to the change the transparency of any layer, and/or the like. Thus, the user interface may provide a user with tools sufficient to allow the user to identify location(s) at which damage and/or loss of life is possible due to a hazard and/or the cause of the hazard or a cause of the hazard occurring at a particular frequency so that the user can take appropriate action (e.g., inspect a site at which equipment may be present, deploy future equipment or other infrastructure at a different location away from the equipment or other infrastructure identified by the infrastructure identification artificial intelligence model that may be causing the hazard and/or the hazard to occur at a particular frequency, notify technicians of location(s) of existing equipment or other infrastructure that may pose a danger to the technicians, move or remove known equipment or other infrastructure to a different location away from the equipment or other infrastructure identified by the infrastructure identification artificial intelligence model that may be causing the hazard and/or the hazard to occur at a particular frequency, etc.).

The hazard alert generator 125 can generate an alert or notification for transmission to a user device 102 or the hazard response system 170 in response to a predicted hazard and/or an identification of a cause of a hazard or a cause of a hazard occurring at a particular frequency. For example, the hazard predictor 121 may predict a future hazard and the map generator 124 may detect an intersection between the future hazard and equipment or other infrastructure and/or an event, such as an intersection between a future hazard having a severity or other characteristic satisfying a condition and equipment or other infrastructure and/or an event. In some embodiments, the map generator 124 can obtain event data from the event data store 160, which can include data indicating a time, location, size (e.g., number of people, square footage, etc.), duration, type, and/or the like of one or more events that have, are, or will be occurring, and annotate the geographic map to indicate information about one or more events. Thus, the map generator 124 can identify intersections not only between a predicted hazard and equipment or other infrastructure, but also intersections between a location and time of a predicted hazard and a location and time of an event (and can annotate the geographic map accordingly to indicate this intersection). In response to identifying an intersection, the hazard alert generator 125 can generate an alert or notification that indicates that a hazard is predicted to impact the equipment or other infrastructure and/or event. The hazard alert generator 125 can transmit the alert to the user device 102 so that an operator of the user device 102 can take appropriate action (e.g., move equipment, protect equipment from the elements, take shelter, evacuate an event, inform participants at the event to take shelter, close a retractable roof, call 911 or other emergency response providers, provide police services, provide fire services, provide medical services, call a news organization, etc.).

Alternatively or in addition, the hazard alert generator 125 can transmit the alert to the hazard response system 170, which may cause an operator of the hazard response system 170 to take appropriate action (e.g., move equipment, protect equipment from the elements, take shelter, evacuate an event, inform participants at the event to take shelter, close a retractable roof, call 911 or other emergency response providers, provide police services, provide fire services, provide medical services, call a news organization, etc.) or which may cause an appropriate action to take place automatically (e.g., move equipment, protect equipment from the elements, generate an audible and/or visual message instructing others to shelter, generate an audible and/or visual message instructing others to evacuate an event, close a retractable roof, initiate a call to 911 or other emergency response provider and/or instruct emergency response services (e.g., police, fire, emergency medical technician (EMT), etc.) to resolve a situation, initiate a call to a news organization, etc.). For example, the hazard response system 170 may perform the action(s) itself or may be in communication with one or more computing systems, electrical systems, mechanical systems, telecommunications systems, messaging systems, etc. that the hazard response system 170 instructs to perform the appropriate action(s).

In some embodiments, the hazard alert generator 125 can transmit the alert to multiple user devices 102 and/or hazard response systems 170. As one illustrative example, various user devices 102 may each be operated by a resident within a geographic location and/or an attendee at an event within the geographic location. The hazard alert generator 125 can identify properties within a geographic area and/or residents or event attendees of those properties by analyzing property data, and transmit the alert to some or all of the user devices 102 operated by residents and/or event attendees in the geographic location as a public safety measure, providing advance notice to the residents and/or event attendees that a predicted hazard may be occurring soon in a vicinity of an area in which the residents reside (e.g., within a threshold distance of an area in which the residents reside) and/or in a vicinity of an area at which the event is located (e.g., within a threshold distance of an area at which the event is located) and to take appropriate action to protect themselves from the predicted hazard. The hazard alert generator 125 can determine a current location of some or all of the user devices 102 and/or can determine a preset location of some or all of the user devices 102, and can transmit the alert to some or all of the user devices 102 that are currently within or have a present location within a threshold distance of an area predicted to be impacted by the hazard.

In further embodiments, the hazard alert generator 125 can obtain event data from the event data store 160 and selectively determine whether to transmit an alert to a user device 102 or hazard response system 170 associated with the event using the event data. For example, the map generator 124 may identify an intersection between a predicted hazard and an event occurring at the time of the predicted hazard and in a location that is predicted to be impacted by the predicted hazard (or an intersection between a hazard predicted to have a characteristic that satisfies a condition and an event occurring at the time of the predicted hazard and in a location that is predicted to be impacted by the predicted hazard). Before generating and transmitting the alert, the hazard alert generator 125 can use the event data to determine a size of the event that intersects with the predicted hazard, such as the number of people that are attending or that are expected to attend the event. The hazard alert generator 125 can generate a score based at least on the size of the event and generate and transmit the alert if the score exceeds a threshold value (e.g., where the score may increase the larger the size of the event). The score may further be affected by the type of event (e.g., the score may be lower for an indoor event rather than an outdoor event if the hazard is related to weather, the score may be higher for an indoor event rather than an outdoor event if the hazard is an earthquake or fire, etc.), the duration of the event (e.g., the score may be lower if the event is expected to end after the predicted hazard passes if the hazard may be more dangerous when an event is not occurring, the score may be higher if the event is expected to end after the predicted hazard passes if the hazard may be more dangerous while the event is occurring, etc.), the location of the event (e.g., the score may be higher if the event is near a body of water and the hazard is flooding, the score may be higher if the event is near a hillside and the hazard is a mud slide, the score may be lower if the event is near other structures that shelter the event, etc.), and/or the like.

As another example, the infrastructure identifier 122 may identify equipment or other infrastructure depicted in a geographic image at which a hazard occurred, which may indicate that the equipment or other infrastructure caused the hazard or contributed to the hazard occurring at a certain frequency. In some embodiments, the map generator 124 can obtain event data from the event data store 160, which can include data indicating a time, location, size (e.g., number of people, square footage, etc.), duration, type, and/or the like of one or more events that have, are, or will be occurring, and annotate the geographic map to indicate information about one or more events. Thus, the map generator 124 can identify intersections between equipment or other infrastructure that may have caused a hazard to occur nearby and/or at a certain frequency and a location of known equipment or other infrastructure and/or an event (and can annotate the geographic map accordingly to indicate this intersection). In response to identifying an intersection, the hazard alert generator 125 can generate an alert or notification that indicates that specific equipment or other infrastructure may have caused a hazard to occur and/or to occur at a particular frequency near or at a location of the known equipment or other infrastructure and/or event. The hazard alert generator 125 can transmit the alert to the user device 102 so that an operator of the user device 102 can take appropriate action (e.g., move equipment, protect equipment from the elements, take shelter, evacuate an event, inform participants at the event to take shelter, close a retractable roof, call 911 or other emergency response providers, provide police services, provide fire services, provide medical services, call a news organization, etc.).

Alternatively or in addition, the hazard alert generator 125 can transmit the alert to the hazard response system 170, which may cause an operator of the hazard response system 170 to take appropriate action (e.g., move equipment, protect equipment from the elements, take shelter, evacuate an event, inform participants at the event to take shelter, close a retractable roof, call 911 or other emergency response providers, provide police services, provide fire services, provide medical services, call a news organization, etc.) or which may cause an appropriate action to take place automatically (e.g., move equipment, protect equipment from the elements, generate an audible and/or visual message instructing others to shelter, generate an audible and/or visual message instructing others to evacuate an event, close a retractable roof, initiate a call to 911 or other emergency response provider and/or instruct emergency response services (e.g., police, fire, EMT, etc.) to resolve a situation, initiate a call to a news organization, etc.). For example, the hazard response system 170 may perform the action(s) itself or may be in communication with one or more computing systems, electrical systems, mechanical systems, telecommunications systems, messaging systems, etc. that the hazard response system 170 instructs to perform the appropriate action(s).

In some embodiments, the hazard alert generator 125 can transmit the alert to multiple user devices 102 and/or hazard response systems 170. As one illustrative example, various user devices 102 may each be operated by a resident within a geographic location and/or an attendee at an event within the geographic location. The hazard alert generator 125 can identify properties within a geographic area and/or residents or event attendees of those properties by analyzing property data, and transmit the alert to some or all of the user devices 102 operated by residents and/or event attendees in the geographic location as a public safety measure, providing a warning to residents and/or event attendees that certain equipment or other infrastructure may be causing hazards to occur and/or to occur at a certain frequency in a vicinity of an area in which the residents reside (e.g., within a threshold distance of an area in which the residents reside) and/or in a vicinity of an area at which the event is located (e.g., within a threshold distance of an area at which the event is located) and to take appropriate action to protect themselves from the hazard going forward. The hazard alert generator 125 can determine a current location of some or all of the user devices 102 and/or can determine a preset location of some or all of the user devices 102, and can transmit the alert to some or all of the user devices 102 that are currently within or have a present location within a threshold distance of an area impacted by the hazard.

In further embodiments, the hazard alert generator 125 can obtain event data from the event data store 160 and selectively determine whether to transmit an alert to a user device 102 or hazard response system 170 associated with the event using the event data. For example, the map generator 124 may identify an intersection between equipment or other infrastructure that causes a hazard and/or that causes a hazard to occur at a certain frequency and an event occurring in a location that is impacted by the hazard (or an intersection between a hazard that had a characteristic that satisfies a condition and an event occurring in a location that is impacted by the predicted hazard). Before generating and transmitting the alert, the hazard alert generator 125 can use the event data to determine a size of the event that intersects with the hazard, such as the number of people that are attending or that are expected to attend the event. The hazard alert generator 125 can generate a score based at least on the size of the event and generate and transmit the alert if the score exceeds a threshold value (e.g., where the score may increase the larger the size of the event). The score may further be affected by the type of event (e.g., the score may be lower for an indoor event rather than an outdoor event if the hazard is related to weather, the score may be higher for an indoor event rather than an outdoor event if the hazard is an earthquake or fire, etc.), the duration of the event (e.g., the score may be lower if the event is expected to end after the predicted hazard passes if the hazard may be more dangerous when an event is not occurring, the score may be higher if the event is expected to end after the predicted hazard passes if the hazard may be more dangerous while the event is occurring, etc.), the location of the event (e.g., the score may be higher if the event is near a body of water and the hazard is flooding, the score may be higher if the event is near a hillside and the hazard is a mud slide, the score may be lower if the event is near other structures that shelter the event, etc.), and/or the like.

In further embodiments, the hazard alert generator 125 can generate and transmit alerts or notifications to one or more user devices 102 and/or one or more hazard response systems 170 in response to user-defined preferences. For example, a user interface rendered by a user device 102 or another system using the user interface data generated by the map generator 124 and/or another user interface displayed by a user device 102 or another system may allow a user to indicate a geographic location, a geographic area, an event, and/or equipment and/or other infrastructure that is of interest. As an illustrative example, the user interface may depict one or more geographic locations, one or more geographic areas, one or more events, one or more equipment or other infrastructure, etc. Via the user interface, the user can highlight, select, mark, or otherwise choose a geographic location, a geographic area, an event, and/or equipment or other infrastructure that is depicted and provide parameters for when an alert or notification should be sent in relation to the selected. For example, via the user interface, a user can set preferences for the alert or notification that indicate under what conditions an alert or notification should be generated or transmitted (e.g., if a hazard has a characteristic that does or does not exceed a threshold, if the severity of the hazard satisfies a condition, if the number of times the hazard occurs within a first time period exceeds a threshold, etc.). If the hazard predictor 121 predicts that a hazard may occur and the map generator 124 generates data indicating that the predicted hazard may impact the geographic location, the geographic area, the event, and/or equipment or other infrastructure selected by the user and that the condition under which an alert or notification is to be generated or transmitted is satisfied, then the hazard alert generator 125 can generate the alert or notification and transmit the alert or notification to the appropriate user device 102 or other system (e.g., the user device 102 or system, such as the hazard response system 170, that selected the geographic location, geographic area, the event, and/or equipment or other infrastructure and/or that set the preferences for when an alert or notification is to be generated and transmitted). Similarly, if the infrastructure identifier 122 identifies equipment and/or other infrastructure that may be caused a hazard to occur and/or a hazard to occur at a certain frequency and the map generator 124 generates data indicating that the hazard is impacting the geographic location, the geographic area, the event, and/or equipment or other infrastructure selected by the user and that the condition under which an alert or notification is to be generated or transmitted is satisfied, then the hazard alert generator 125 can generate the alert or notification and transmit the alert or notification to the appropriate user device 102 or other system (e.g., the user device 102 or system, such as the hazard response system 170, that selected the geographic location, geographic area, the event, and/or equipment or other infrastructure and/or that set the preferences for when an alert or notification is to be generated and transmitted). Thus, a user can use the user interface caused to be generated by the hazard visualization system 120 to be set an alert or notification service that notifies the user when a predicted hazard or a hazard that already occurred has, is, or will be impacting a location, area, and/or equipment or other infrastructure of interest. As described herein, the user can be a resident in a geographic location (e.g., a property owner, a renter, etc.), an organizer of an event, an attendee of an event, an emergency response team, an operator or owner of equipment or other infrastructure, and/or any one else that may be located within a particular geographic region and may have an interest in protecting themselves and/or protecting property or objects from hazards.

The ML model data store 126 can store artificial intelligence models trained by the hazard visualization system 120. For example, the hazard predictor 121 can store a trained hazard prediction artificial intelligence model in the ML model data store 126. As another example, the infrastructure identifier 122 can store a trained infrastructure identification artificial intelligence model in the ML model data store 126. Stored models can later be retrieved by the hazard predictor 121 or the infrastructure identifier 122 from the ML model data store 126 when predictions or identifications are to be run. While the ML model data store 126 is depicted as being located internal to the hazard visualization system 120, this is not meant to be limiting. For example, not shown, the ML model data store 126 can be located external to the hazard visualization system 120.

The infrastructure data store 127 can store infrastructure data associated with known or identified equipment or other infrastructure. For example, the infrastructure data can include an indication of a type, location, condition, and/or any other characteristic of one or more equipment or other infrastructure. As an illustrative example, the infrastructure data can include data indicating that the infrastructure is transmission lines, the voltage of the transmission lines, the location(s) of the transmission lines, the manufacturer or operator of the transmission lines, the status or condition of the transmission lines (e.g., whether the transmission lines are in operation, decommissioned, etc.; the age of the transmission lines; any known damage to the transmission lines; etc.), and/or the like. The infrastructure data can also include geographic images annotated to indicate the location of equipment or other infrastructure, geographic images annotated to indicate the location of objects other than equipment or other infrastructure, and/or geographic images annotated to indicate that no equipment or other infrastructure is present (where an annotation may include one or more pixels marked or otherwise associated with metadata to indicate the appropriate information). While the infrastructure data store 127 is depicted as being located internal to the hazard visualization system 120, this is not meant to be limiting. For example, not shown, the infrastructure data store 127 can be located external to the hazard visualization system 120.

The geo-images data store 140 can store one or more geographic images (e.g., aerial images, satellite images, terrain images, topographical maps, etc.) of one or more geographic locations. The geographic images may depict various objects, such as natural and manmade objects. While the geo-images data store 140 is depicted as being located external to the hazard visualization system 120, this is not meant to be limiting. For example, not shown, the geo-images data store 140 can be located internal to the hazard visualization system 120.

The hazard data store 150 can store historical and/or current hazard data for one or more geographic locations or areas. While the hazard data store 150 is depicted as being located external to the hazard visualization system 120, this is not meant to be limiting. For example, not shown, the hazard data store 150 can be located internal to the hazard visualization system 120.

The event data store 160 can store event data for one or more events that has, will, or will be occurring in one or more geographic locations or areas. While the event data store 160 is depicted as being located external to the hazard visualization system 120, this is not meant to be limiting. For example, not shown, the event data store 160 can be located internal to the hazard visualization system 120.

The hazard response system 170 can be a computing system having memory storing computer-executable instructions and one or more hardware processors in communication with the memory, where the computer-executable instructions, when executed by the one or more hardware processors, cause the hardware processor(s) to perform various actions in response to receiving an alert or notification from the hazard alert generator 125. The hazard response system 170 may be a single computing device, or it may include multiple distinct computing devices, such as computer servers, logically or physically grouped together to collectively operate as a server system. The components of the hazard response system 170 can each be implemented in application-specific hardware (e.g., a server computing device with one or more ASICs) such that no software is necessary, or as a combination of hardware and software. In addition, the modules and components of the hazard response system 170 can be combined on one server computing device or separated individually or into groups on several server computing devices. In some embodiments, the hazard response system 170 may include additional or fewer components than illustrated in FIG. 1.

In some embodiments, the features and services provided by the hazard response system 170 may be implemented as web services consumable via the communication network 110. In further embodiments, the hazard response system 170 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As described herein, the hazard response system 170 can perform various operations or can be in communication with other systems and instruct such systems to perform the operations. As an example, the hazard response system 170 can be a 911 call center, a system run by an emergency response team, a police department system, a fire department system, an EMT system, a system operated by organizers of an event, a system operated by a news organization, and/or the like.

Example Block Diagrams for Predicting a Hazard

Figure 2A:
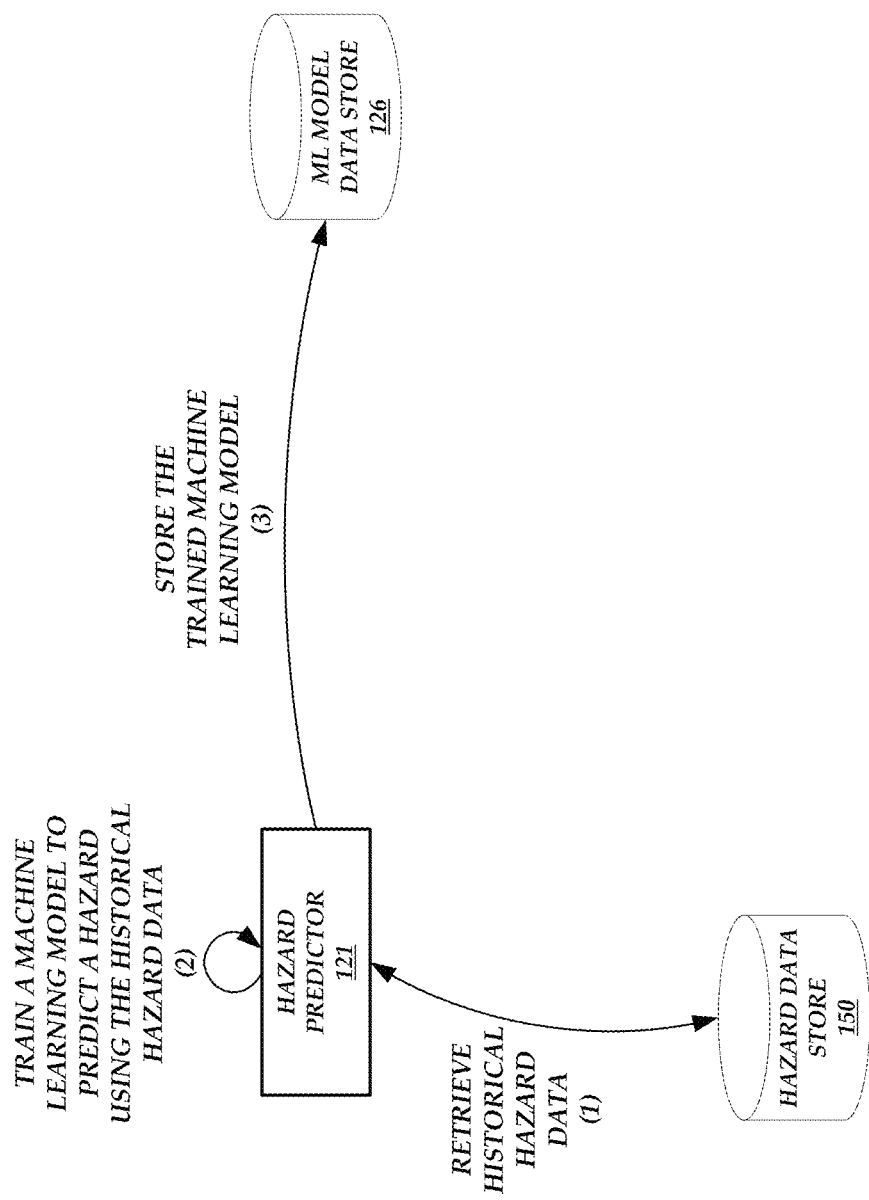
FIG. 2A is a flow diagram illustrating the operations performed by the components of the operating environment of FIG. 1 to train a hazard prediction artificial intelligence model.

FIG. 2A is a flow diagram illustrating the operations performed by the components of the operating environment 100 of FIG. 1 to train a hazard prediction artificial intelligence model (e.g., a hazard prediction machine learning model). As illustrated in FIG. 2A, the hazard predictor 121 retrieves historical hazard data from the hazard data store 150 at (1). The hazard predictor 121 may retrieve historical hazard data corresponding to a particular geographic location or area selected by a user device 102 (e.g., via a user interface).

The hazard predictor 121 can then train a machine learning model to predict a hazard using the historical hazard data at (2). For example, the machine learning model may be trained to predict a hazard at the geographic location or area selected by the user device 102 for a time or time period selected by the user device 102 (e.g., via a user interface). After training the machine learning model, the hazard predictor 121 can store the machine learning model in the ML model data store 126 at (3).

Figure 2B:
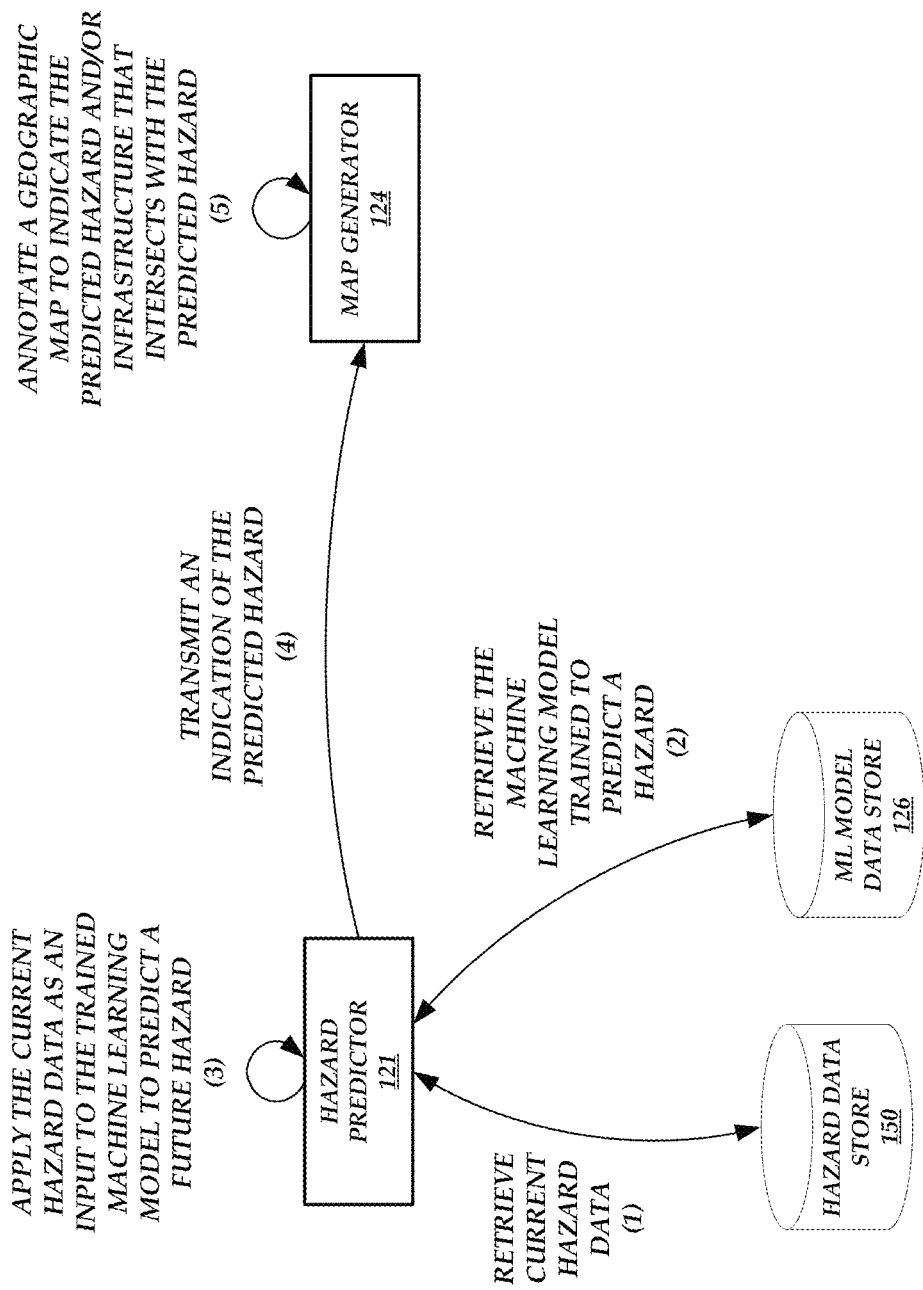
FIG. 2B is a flow diagram illustrating the operations performed by the components of the operating environment of FIG. 1 to predict a hazard.

FIG. 2B is a flow diagram illustrating the operations performed by the components of the operating environment 100 of FIG. 1 to predict a hazard. As illustrated in FIG. 2B, the hazard predictor 121 retrieves current hazard data from the hazard data store 150 at (1). For example, the hazard predictor 121 can retrieve current hazard data corresponding to a geographic location or area selected by a user device 102 (e.g., via a user interface). Before, during, and/or after retrieving the current hazard data, the hazard predictor 121 retrieves the machine learning model trained to predict a hazard at (2), such as the machine learning model trained as described above with respect to FIG. 2A.

The hazard predictor 121 can then apply the current hazard data as an input to the trained machine learning model to predict a future hazard at (3). For example, the machine learning model may output a prediction of a future hazard that may occur at the geographic location selected by the user device 102 at a time or during a time period selected by the user device 102 (e.g., via the user interface). Alternatively or in addition to providing the current hazard data as an input to the trained machine learning model, the hazard predictor 121 can provide the selected geographic location and/or time or time period as an input to the trained machine learning model. The trained machine learning model may output a predicted hazard as a result, and the hazard predictor 121 can transmit an indication of the predicted hazard to the map generator 124 at (4).

The map generator 124 can annotate a geographic map to indicate the predicted hazard and/or infrastructure that intersects with the predicted hazard at (5). For example, the annotated geographic map may include one layer that depicts aerial imagery, another layer that depicts the predicted hazard, another layer that depicts infrastructure, and/or another layer that annotates, labels, highlights, or otherwise marks a geographic location at which a location of the predicted hazard and the infrastructure overlap.

Example Block Diagrams for Determining a Cause of a Hazard

Figure 3A:
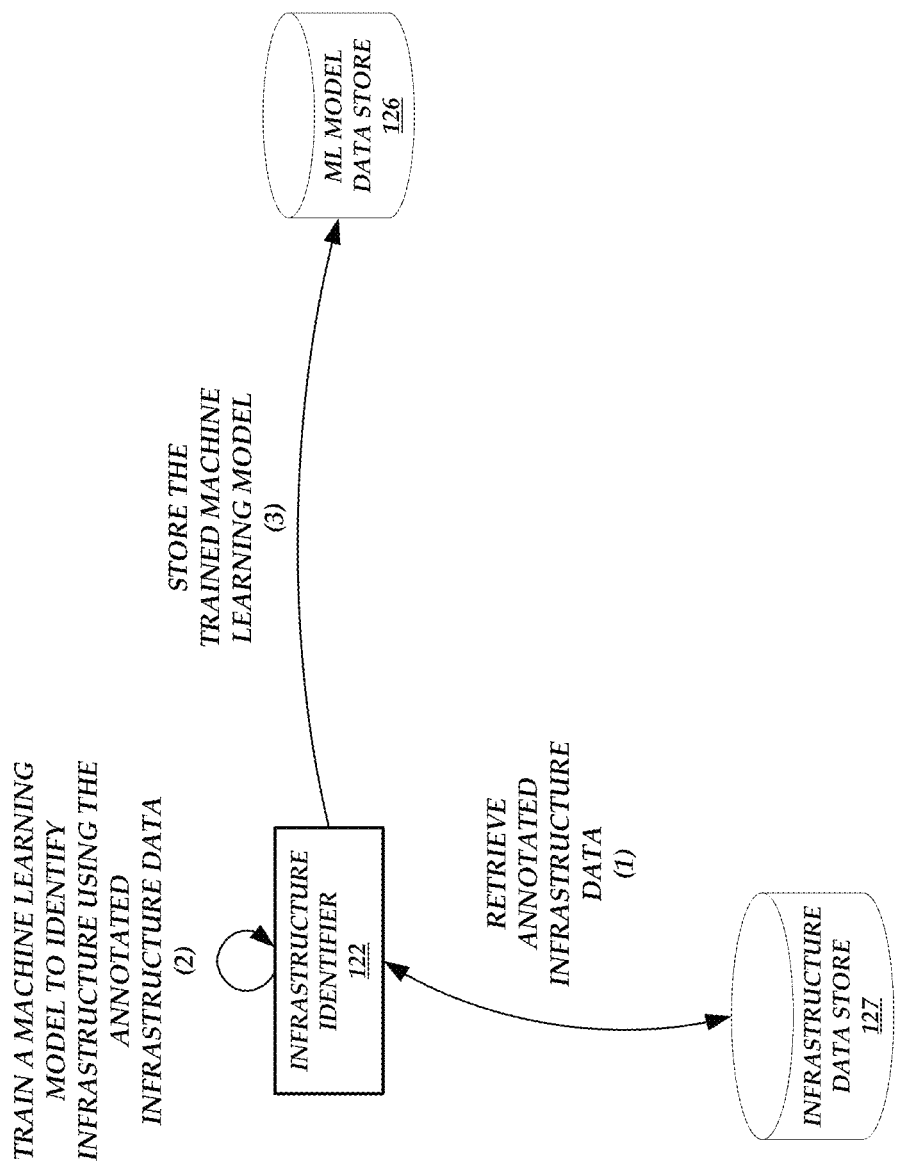
FIG. 3A is a flow diagram illustrating the operations performed by the components of the operating environment of FIG. 1 to train an infrastructure identification artificial intelligence model.

FIG. 3A is a flow diagram illustrating the operations performed by the components of the operating environment 100 of FIG. 1 to train an infrastructure identification artificial intelligence model (e.g., an infrastructure identification machine learning model). As illustrated in FIG. 3A, the infrastructure identifier 122 retrieves annotated infrastructure data from the infrastructure data store 127 at (1).

The infrastructure identifier 122 can then train a machine learning model to identify infrastructure using the annotated infrastructure data at (2). For example, the machine learning model may be trained to identify infrastructure in portions of geographic images that correspond to location(s) at which a hazard occurred and/or a hazard occurred having a certain characteristic. After training the machine learning model, the infrastructure identifier 122 can store the machine learning model in the ML model data store 126 at (3).

Figure 3B:
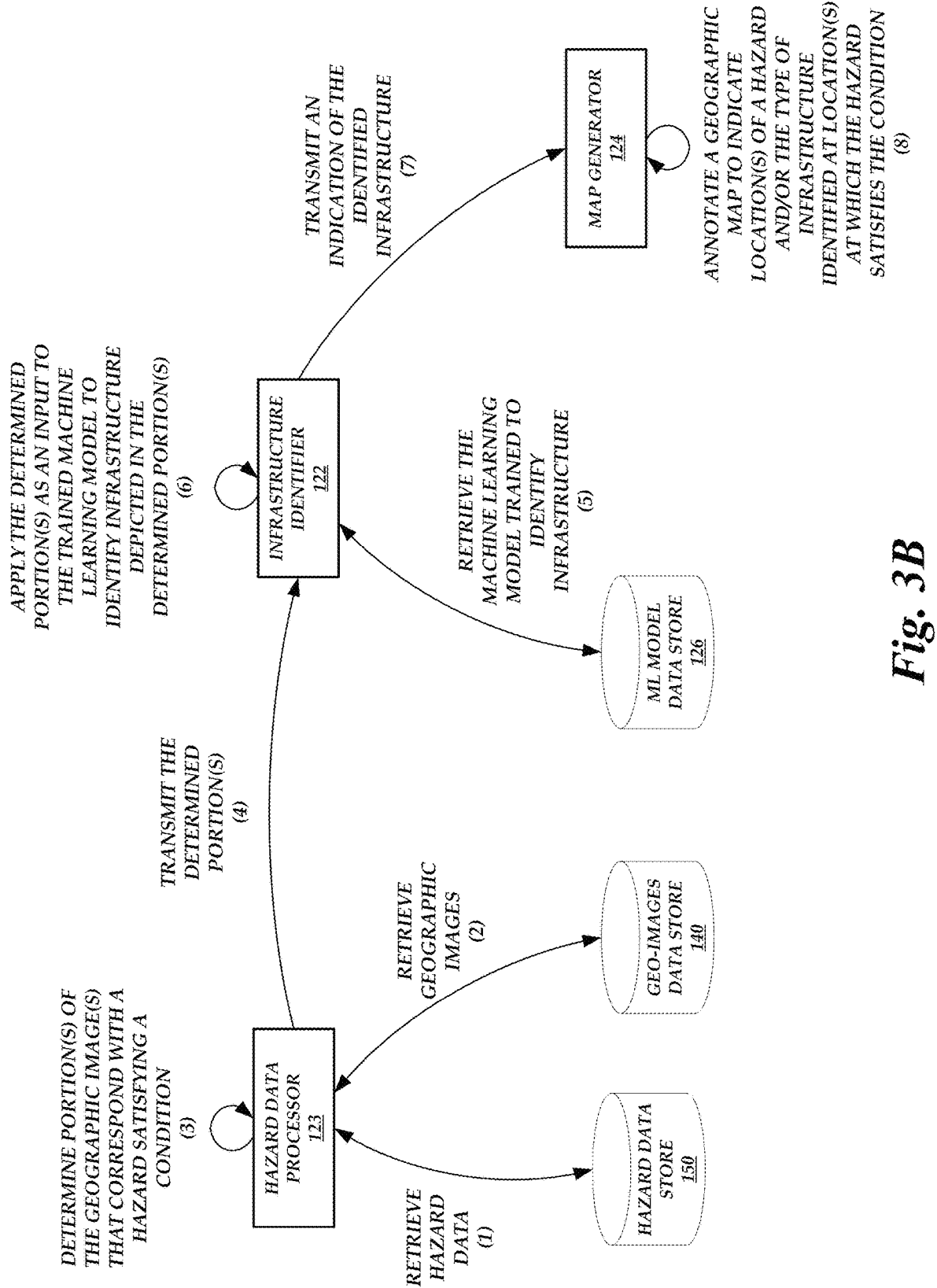
FIG. 3B is a flow diagram illustrating the operations performed by the components of the operating environment of FIG. 1 to identify infrastructure in a geographic image.

FIG. 3B is a flow diagram illustrating the operations performed by the components of the operating environment 100 of FIG. 1 to identify infrastructure in a geographic image. As illustrated in FIG. 3B, the hazard data processor 123 retrieves hazard data from the hazard data store 150 at (1). For example, the hazard data processor 123 can retrieve historical and/or current hazard data corresponding to a geographic location or area selected by a user device 102 (e.g., via a user interface). Before, during, and/or after retrieving the current hazard data, the hazard data processor 123 retrieves one or more geographic images from the geo-images data store 140 at (2). For example, the retrieved geographic image(s) may correspond to a geographic location or area selected by a user device 102 (e.g., via a user interface), such as a location that includes known equipment or other infrastructure owned, operated, monitored, etc. by a user of the user device 102.

The hazard data processor 123 can determine portion(s) of the geographic image(s) that correspond with a hazard satisfying a condition at (3). For example, the hazard data processor 123 can use the hazard data to identify hazards that satisfy the condition (e.g., have a certain wind speed, flood water level, earthquake magnitude, temperate, etc.) and can filter out portions of the geographic image(s) retrieved from the geo-images data store 140 that correspond to locations other than the location(s) at which the condition is satisfied. The hazard data processor 123 can transmit the determined portion(s) to the infrastructure identifier 122 at (4).

The infrastructure identifier 122 can retrieve the machine learning model trained to identify infrastructure at (5), such as the machine learning model trained as described above with respect to FIG. 3A. The infrastructure identifier 122 can then apply the determined portion(s) of the geographic image(s) as an input to the trained machine learning model to identify infrastructure depicted in the determined portion(s) at (6). For example, the trained machine learning model may output an indication of pixel(s) in the determined portion(s) that depict infrastructure. The infrastructure identifier 122 can transmit an indication of the identified infrastructure (e.g., an indication of the pixel(s) depicting the identified infrastructure and/or an indication of the type of infrastructure identified) to the map generator 124 at (7).

The map generator 124 can annotate a geographic map to indicate location(s) of a hazard and/or the type of infrastructure identified at location(s) at which the hazard satisfies the condition at (8). For example, the annotated geographic map may include one layer that depicts aerial imagery, another layer that depicts the hazard, another layer that depicts identified infrastructure, and/or another layer that annotates, labels, highlights, or otherwise marks a geographic location at which a location of the hazard and the identified infrastructure overlap.

Example User Interfaces

Figure 4:
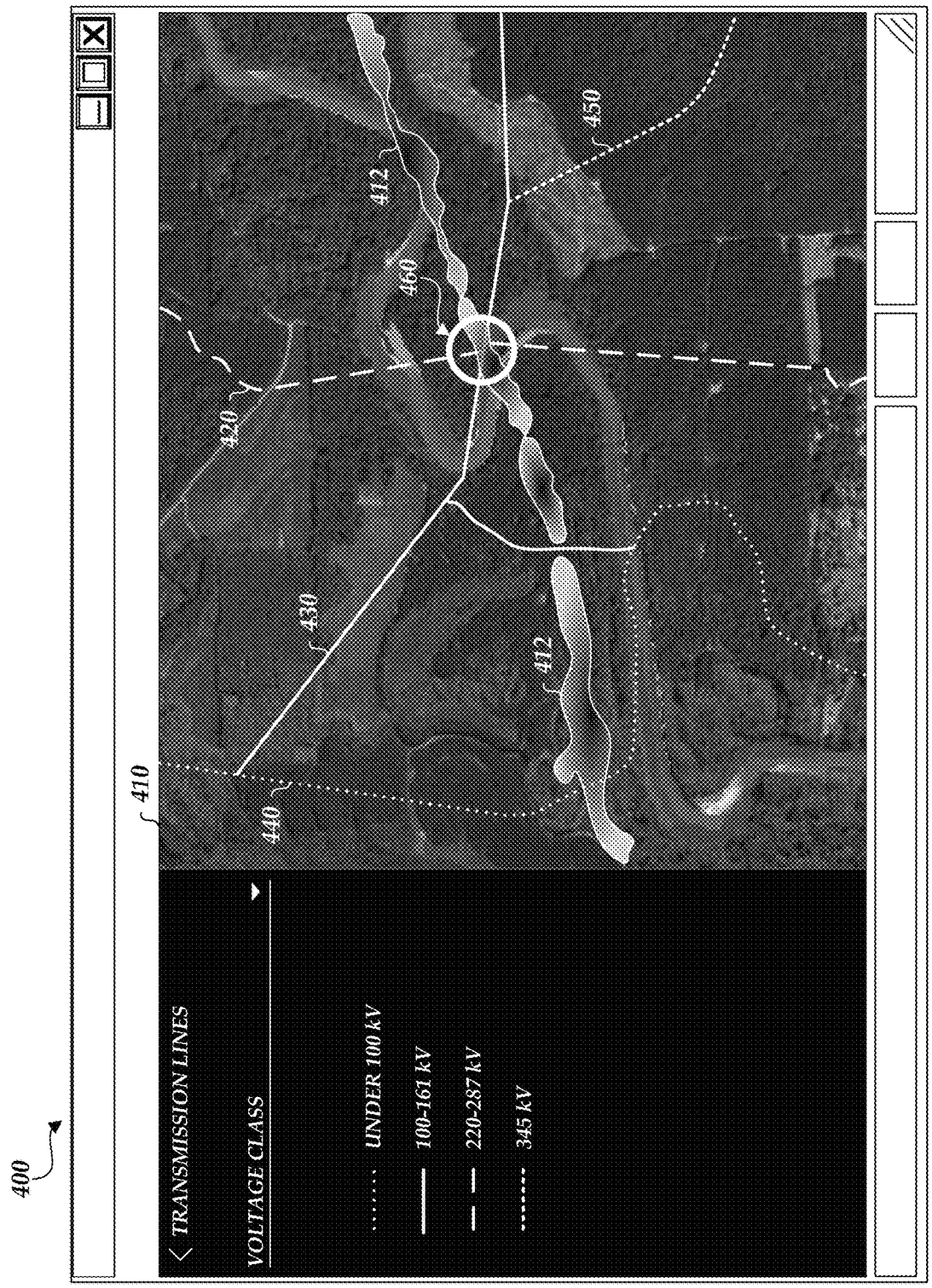
FIG. 4 illustrates an example user interface depicting a location at which a predicted hazard and equipment or other infrastructure intersect.

FIG. 4 illustrates an example user interface 400 depicting a location at which a predicted hazard and equipment or other infrastructure intersect. The example user interface 400 may be rendered and displayed by a user device 102 in response to receiving user interface data from the map generator 124. For example, the user interface data, when processed by the user device 102, may cause the user device 102 to render and display the user interface 400.

As illustrated in FIG. 4, the user interface 400 includes a window 410 depicting an annotated geographic map. For example, the annotated geographic map may indicate the path of a hazard 412 (e.g., a tornado) predicted by the hazard visualization system 120 and locations of different types of transmission lines 420, 430, 440, and 450. The path of the hazard 412 may be a still image or an animation in which the path or location of the hazard 412 moves over time (e.g., where the time may be indicated or selected via a slider, not shown). In addition, the annotated geographic map may indicate a location 460 at which the hazard 412 is predicted to impact, a characteristic of the hazard 412 that satisfies a condition (e.g., the wind speed of the tornado exceeds a threshold speed), and infrastructure (e.g., transmission lines 420 and 430) that are present.

The annotated geographic map may include one or more layers. For example, one layer may include an aerial image of land at a particular location (which can be a still image or an animation, and which may be two-dimensional or three-dimensional), a second layer may include data for depicting the predicted hazard 412, one or more third layers may include data for depicting the locations of one or more of the different types of transmission lines 420, 430, 440, and 450, and a fourth layer may include data for depicting the intersection of the hazard 412 and the transmission lines 420 and 430 at the location 460. Via the user interface 400, a user may hide, unhide (e.g., make visible), delete, add, lock, and/or the like any of these layers. In addition, the user can use controls provided by the user interface 400 to adjust the hierarchy of the layers such that any one layer can sit on top of any other layer. The user interface 400 may also allow a user to change the color or transparency of any information depicted in a layer. While certain layers are described herein, this is not meant to be limiting. The annotated geographic map can include more, fewer, and/or different layers, such as other layers that include data for depicting other equipment, infrastructure, events, hazards, or weather.

In some embodiments, the annotated geographic map may not highlight or otherwise mark a location at which the transmission line 440 intersects the hazard 412. For example, this intersection may not be highlighted or otherwise marked because the characteristic of the hazard 412 may not satisfy a condition at the location at which the intersection occurs.

In further embodiments, not shown, the user interface 400 can depict live or real-time information alternatively to or in addition to some or all of the information described above as being depicted within the user interface 400. As used herein, live or real-time information can be information that is generated, captured, produced, or otherwise obtained within a short time of a current time (e.g., within a millisecond, within a second, within a minute, etc. of a current time). For example, cameras, satellites, or other image capture equipment may be located at one or more geographic locations shown in the window 410. The user interface 400 may include one or more selectable, graphical objects overlaid over the aerial imagery shown in window 410 (e.g., separate layer(s) of selectable, graphical objects) that represent the location(s) of these cameras, satellites, or other image capture equipment. When a user selects a graphical object in the user interface 400, the user interface 400 may open a new window (e.g., a pop-up window overlaying the window 410, a new window separate from the window 410, etc.), a new panel (e.g., to the side, bottom, or top of the window 410), a new tab, and/or the like that depicts historical image(s) captured by the corresponding camera, satellite, or other image capture equipment, current image(s) captured by the corresponding camera, satellite, or other image capture equipment (e.g., real-time image(s), such as those captured within a millisecond, within a second, within a minute, etc. of when the graphical object was selected), historical video(s) captured by the corresponding camera, satellite, or other image capture equipment, current video(s) captured by the corresponding camera, satellite, or other image capture equipment (e.g., real-time video(s), such as those captured within a millisecond, within a second, within a minute, etc. of when the graphical object was selected), etc. In particular, selection of a graphical object may cause the device showing the user interface 400 (e.g., the user device 102) to request image(s) or video(s) from the camera, satellite, or other image capture equipment associated with the selected graphical object from the hazard visualization system 120 or directly from the camera, satellite, or other image capture equipment itself (e.g., where the user interface data may include an address, such as an Internet Protocol (IP) address of the camera, satellite, or other image capture equipment associated with each graphical object, and selection of a graphical object may cause the user device 102 to communicate with the address to obtain the image(s) or video(s)). If the device requests the image(s) or video(s) from the hazard visualization system 120, the hazard visualization system 120 can obtain the image(s) or video(s) from the camera, satellite, or other image capture equipment referenced in the request (e.g., the request may include the address (e.g., IP address) of the camera, satellite, or other image capture equipment and the hazard visualization system 120 can then communicate with the address included in the request to obtain the information), and send the requested image(s) or video(s) to the device. Thus, the user may be able to view a historical and/or real-time view of an area in which a hazard is predicted to occur.

In still further embodiments, the user interface 400 can display an augmented reality view. For example, a user can view a historical and/or real-time view of an area by selecting a graphical object in the user interface 400, as described above. Before providing the requested image(s) and/or video(s) to the device (e.g., user device 102) displaying the user interface 400, the hazard predictor 121 or map generator 124 can identify an area depicted by an image or video, determine the type of hazard and/or severity of hazard predicted to occur at the area, and modify some or all of the image(s) and/or video(s) by adding one or more layers that depict what the predicted hazard would look like in the area depicted by the image(s) or video(s) and/or that depict damage that may occur to objects and/or nature (e.g., buildings, infrastructure, equipment, trees, rivers, etc.) in the area depicted by the image(s) or video(s). As an illustrative example, if the predicted hazard is hail, the hazard predictor 121 or map generator 124 can identify an area depicted by an image or video, determine the severity of hail predicted to occur at the area depicted by the image or video, and modify the image or video to show hail on the ground, show hail in the air, show hail damage to equipment depicted in the image(s) or video(s), etc., with the size of the hail, amount of hail, and/or the amount of damage depicted depending on the predicted severity of the hazard within the area depicted by the image(s) or video(s). The augmented reality layer(s) can be two-dimensional or three-dimensional. Once the hazard predictor 121 or map generator 124 modifies the obtained image(s) or video(s), then the hazard visualization system 120 can forward the modified image(s) or video(s) to the device displaying the user interface (e.g., separately or as updated or modified user interface data that, when processed by the device, may cause the device to render and display an updated version of the user interface 400 that depicts the augmented reality view in a new layer, new tab, new window, new side panel, new top panel, new bottom panel, etc.). In some embodiments, the hazard visualization system 120 may also forward the original image(s) or video(s) (e.g., within the user interface data or separately). Within the user interface 400, the user may then be able to toggle between an augmented reality view and a non-augmented reality view of the area captured by the camera, satellite, or other image capture equipment. Thus, the user may be able to view a historical and/or real-time view of an area in which a hazard is predicted to occur and an augmented reality view of what the area may look like after the predicted hazard occurs.

Figure 5:
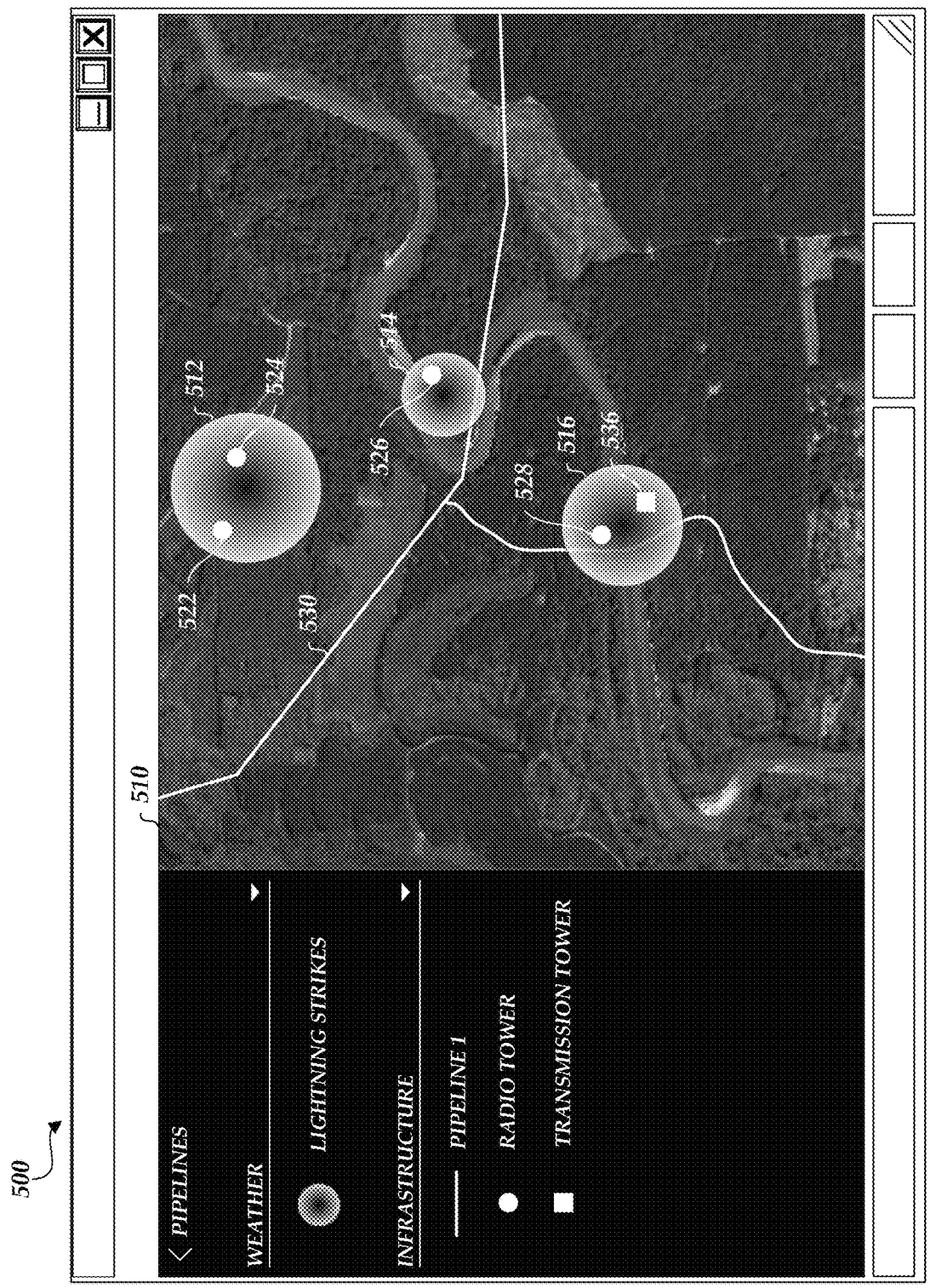
FIG. 5 illustrates an example user interface depicting an identification of infrastructure that may be causing a hazard to occur.

FIG. 5 illustrates an example user interface 500 depicting an identification of infrastructure that may be causing a hazard to occur. The example user interface 500 may be rendered and displayed by a user device 102 in response to receiving user interface data from the map generator 124. For example, the user interface data, when processed by the user device 102, may cause the user device 102 to render and display the user interface 500.

As illustrated in FIG. 5, the user interface 500 includes a window 510 depicting an annotated geographic map. For example, the annotated geographic map may depict several hazards 512, 514, and 516 (e.g., lightning strikes) and the intensity of such hazards 512, 514, 516 (e.g., a number of lightning strikes that have occurred in the respective locations within a period of time, with the contrast in shading indicating the number of lightning strikes (e.g., a larger darker area indicating more lightning strikes and a larger whiter area indicating fewer lightning strikes)). The hazards 512, 514, 516 may be a still image or an animation in which the path or location of the hazards 512, 514, 516 moves over time (e.g., where the time may be indicated or selected via a slider, not shown). The annotated geographic map may also indicate locations of a pipeline 530. In addition, the annotated geographic map may indicate locations of equipment or other infrastructure 522, 524, 526, 528, and 536 identified by the infrastructure identification artificial intelligence model that may be causing the hazards 512, 514, and 516 and/or causing the hazards 512, 514, and 516 to occur a certain number of times within a period of time. As an illustrative example, the equipment or other infrastructure may include radio towers 522, 524, 526, and 528 and a transmission tower 536.

The annotated geographic map may include one or more layers. For example, one layer may include an aerial image of land at a particular location (which can be a still image or an animation, and which may be two-dimensional or three-dimensional, one or more second layers may include data for depicting the hazards 512, 514, and 516, one or more third layers may include data for depicting the locations of one or more of the equipment or other infrastructure 522, 524, 526, 528, and 536 identified by the infrastructure identification artificial intelligence model, and a fourth layer (not shown) may include data for depicting the intersection of the hazards 512, 514, and 516 and the equipment or other infrastructure 522, 524, 526, 528, and 536. Via the user interface 500, a user may hide, unhide (e.g., make visible), delete, add, lock, and/or the like any of these layers. In addition, the user can use controls provided by the user interface 500 to adjust the hierarchy of the layers such that any one layer can sit on top of any other layer. The user interface 500 may also allow a user to change the color or transparency of any information depicted in a layer. While certain layers are described herein, this is not meant to be limiting. The annotated geographic map can include more, fewer, and/or different layers, such as other layers that include data for depicting other equipment, infrastructure, events, hazards, or weather.

In further embodiments, not shown, the user interface 500 can depict live or real-time information alternatively to or in addition to some or all of the information described above as being depicted within the user interface 500. As used herein, live or real-time information can be information that is generated, captured, produced, or otherwise obtained within a short time of a current time (e.g., within a millisecond, within a second, within a minute, etc. of a current time). For example, cameras, satellites, or other image capture equipment may be located at one or more geographic locations shown in the window 510. The user interface 500 may include one or more selectable, graphical objects overlaid over the aerial imagery shown in window 510 (e.g., separate layer(s) of selectable, graphical objects) that represent the location(s) of these cameras, satellites, or other image capture equipment. When a user selects a graphical object in the user interface 500, the user interface 500 may open a new window (e.g., a pop-up window overlaying the window 510, a new window separate from the window 510, etc.), a new panel (e.g., to the side, bottom, or top of the window 510), a new tab, and/or the like that depicts historical image(s) captured by the corresponding camera, satellite, or other image capture equipment, current image(s) captured by the corresponding camera, satellite, or other image capture equipment (e.g., real-time image(s), such as those captured within a millisecond, within a second, within a minute, etc. of when the graphical object was selected), historical video(s) captured by the corresponding camera, satellite, or other image capture equipment, current video(s) captured by the corresponding camera, satellite, or other image capture equipment (e.g., real-time video(s), such as those captured within a millisecond, within a second, within a minute, etc. of when the graphical object was selected), etc. In particular, selection of a graphical object may cause the device showing the user interface 500 (e.g., the user device 102) to request image(s) or video(s) from the camera, satellite, or other image capture equipment associated with the selected graphical object from the hazard visualization system 120 or directly from the camera, satellite, or other image capture equipment itself (e.g., where the user interface data may include an address, such as an IP address of the camera, satellite, or other image capture equipment associated with each graphical object, and selection of a graphical object may cause the user device 102 to communicate with the address to obtain the image(s) or video(s)). If the device requests the image(s) or video(s) from the hazard visualization system 120, the hazard visualization system 120 can obtain the image(s) or video(s) from the camera, satellite, or other image capture equipment referenced in the request (e.g., the request may include the address (e.g., IP address) of the camera, satellite, or other image capture equipment and the hazard visualization system 120 can then communicate with the address included in the request to obtain the information), and send the requested image(s) or video(s) to the device. Thus, the user may be able to view a historical and/or real-time view of an area at which a hazard occurred to see whether any damage has occurred and/or to see what the location looks like after the hazard occurred.

In still further embodiments, the user interface 500 can display an augmented reality view. For example, a user can view a historical and/or real-time view of an area by selecting a graphical object in the user interface 500, as described above. Before providing the requested image(s) and/or video(s) to the device (e.g., user device 102) displaying the user interface 500, the hazard data processor 123 or map generator 124 can identify an area depicted by an image or video, optionally determine the type of hazard and/or severity of hazard that occurred at the area, optionally obtain historical image(s) or video(s) of the area before the hazard occurred, and modify some or all of the image(s) and/or video(s) by adding one or more layers that depict what the area depicted by the image(s) or video(s) would look like before the hazard occurred. As an illustrative example, if the hazard is hail, the hazard data processor 123 or map generator 124 can identify an area depicted by an image or video, optionally determine the severity of hail that occurred at the area depicted by the image or video, optionally obtain historical image(s) or video(s) of the area before the hazard occurred, and modify the image or video to show what the area depicted in the image(s) or video(s) looked like before the hazard occurred, where the hazard data processor 123 or map generator 124 can perform the modification by using the historical image(s) or video(s) and extracted portions of the historical image(s) or video(s) that are different from the current image(s) or video(s) and overlaying these portions (which may show what the area looked like pre-hazard) or by identifying the effects of the hazard in the current image(s) or video(s) and reversing these effects based on knowledge of the severity of the hazard (e.g., the size of the hail, amount of hail, etc.). The augmented reality layer(s) can be two-dimensional or three-dimensional. Once the hazard data processor 123 or map generator 124 modifies the obtained image(s) or video(s), then the hazard visualization system 120 can forward the modified image(s) or video(s) to the device displaying the user interface (e.g., separately or as updated or modified user interface data that, when processed by the device, may cause the device to render and display an updated version of the user interface 400 that depicts the augmented reality view in a new layer, new tab, new window, new side panel, new top panel, new bottom panel, etc.). In some embodiments, the hazard visualization system 120 may also forward the original image(s) or video(s) (e.g., within the user interface data or separately). Within the user interface 400, the user may then be able to toggle between an augmented reality view and a non-augmented reality view of the area captured by the camera, satellite, or other image capture equipment. Thus, the user may be able to view a historical and/or real-time view of an area in which a hazard occurred and an augmented reality view of what the area looked like before the hazard occurred.

Example Hazard Prediction Routine

Figure 6:
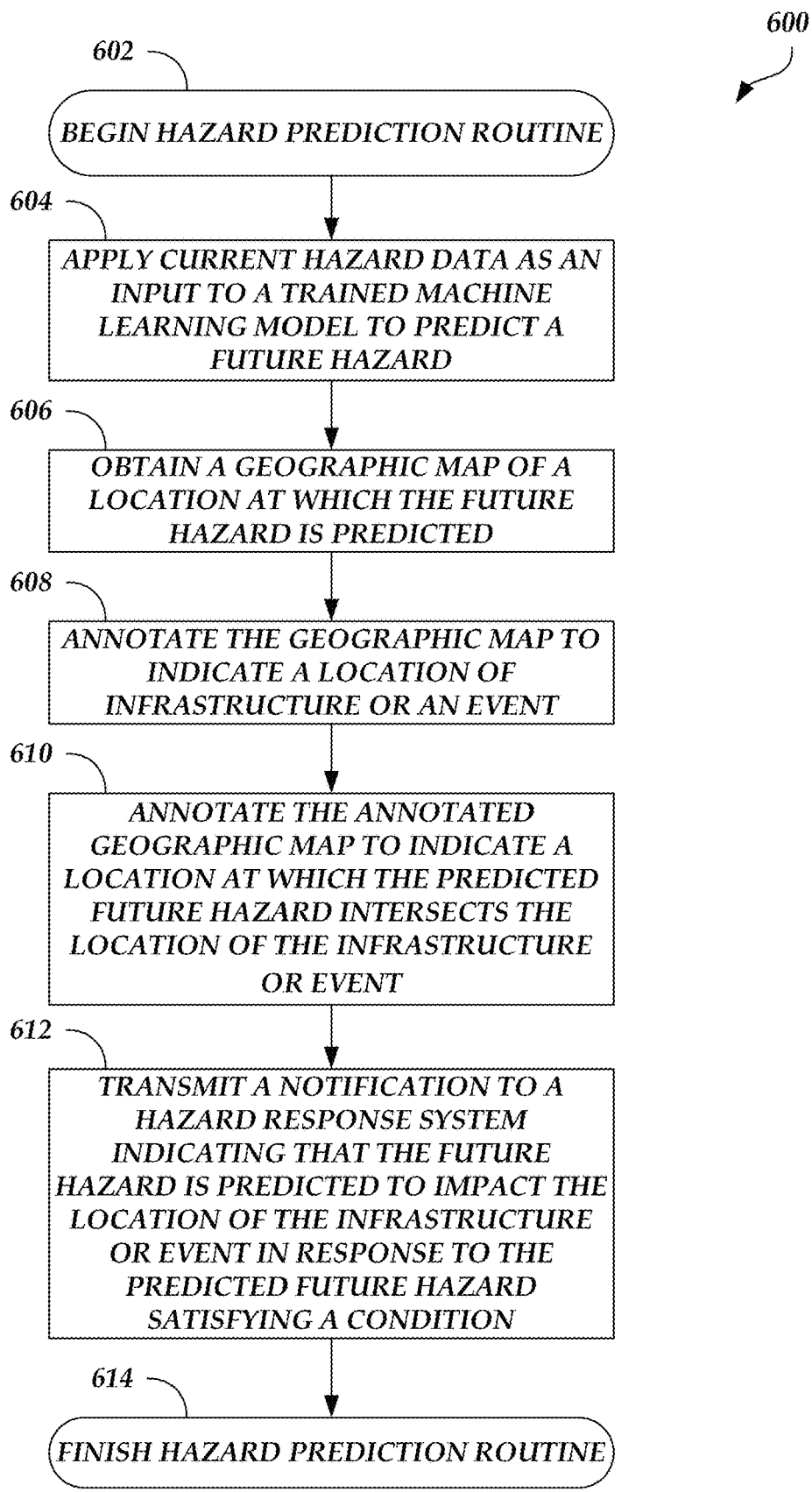
FIG. 6 is a flow diagram depicting a hazard prediction routine illustratively implemented by a hazard visualization system, according to one embodiment.

FIG. 6 is a flow diagram depicting a hazard prediction routine 600 illustratively implemented by a hazard visualization system, according to one embodiment. As an example, the hazard visualization system 120 of FIG. 1 can be configured to execute the hazard prediction routine 600. The hazard prediction routine 600 begins at block 602.

At block 604, current hazard data is applied as an input to a trained machine learning model to predict a future hazard. Alternatively or in addition, a geographic location and a time or time period can be applied as an input to the trained machine learning model to predict the future hazard.

At block 606, a geographic map of a location at which the future hazard is predicted is obtained. The geographic map may include aerial imagery of the land at the location.

At block 608, the geographic map is annotated to indicate a location of infrastructure or an event. For example, the location of infrastructure may be known or predicted by the infrastructure identification artificial intelligence model.

At block 610, the annotated geographic map is annotated to indicate a location at which the predicted future hazard intersects the location of the infrastructure or event. For example, the location may be a location at which the predicted future hazard has a characteristic that satisfies a condition and that intersects with the location of the infrastructure or event.

At block 612, a notification is transmitted to a hazard response system indicating that the future hazard is predicted to impact the location of the infrastructure or event in response to the predicted future hazard satisfying the condition. After the notification is transmitted, the hazard prediction routine 600 ends, as shown at block 614.

Example Hazard Cause Identification Routine

Figure 7:
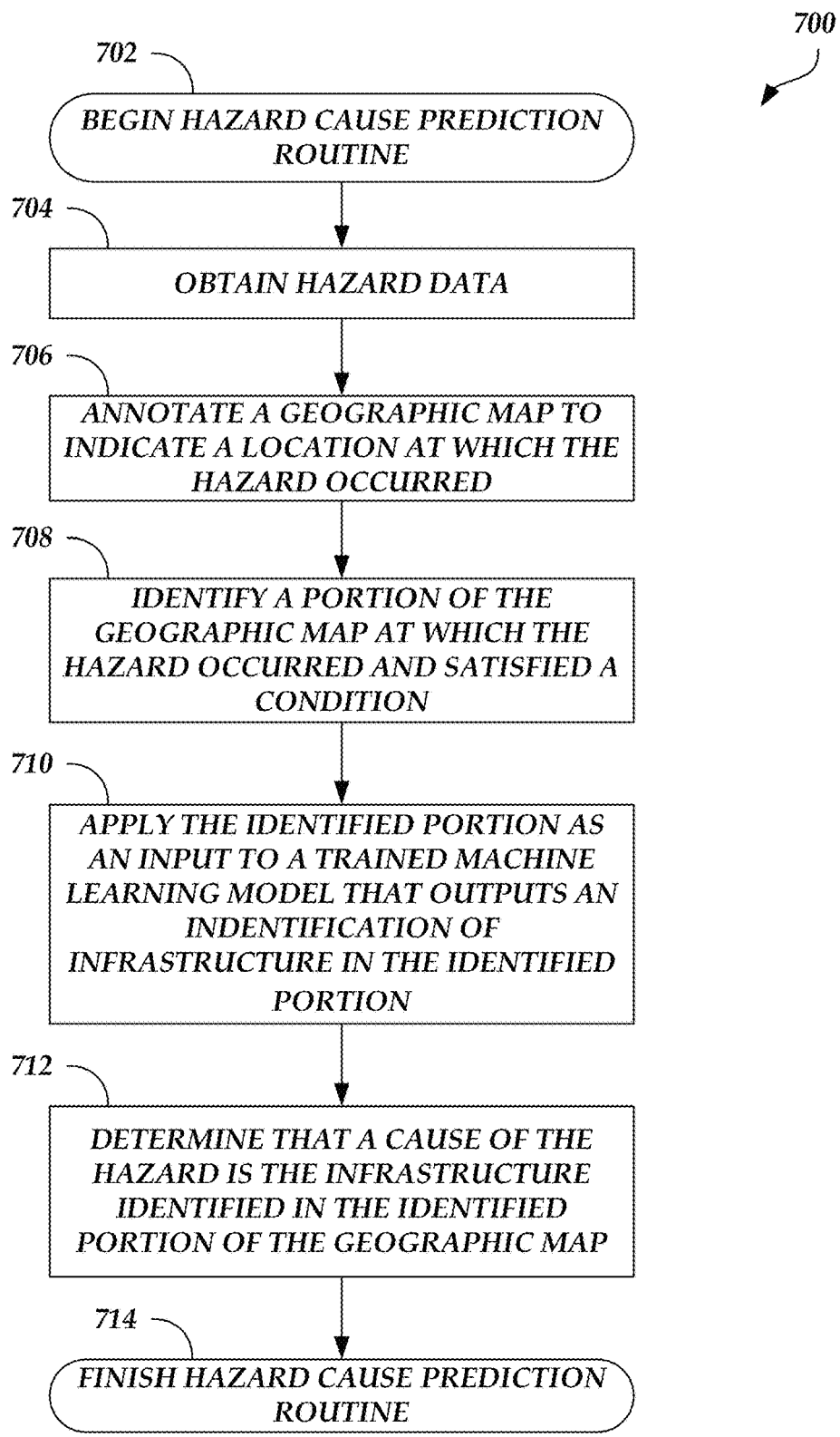
FIG. 7 is a flow diagram depicting a hazard cause identification routine illustratively implemented by a hazard visualization system, according to one embodiment.

FIG. 7 is a flow diagram depicting a hazard cause identification routine 700 illustratively implemented by a hazard visualization system, according to one embodiment. As an example, the hazard visualization system 120 of FIG. 1 can be configured to execute the hazard cause identification routine 700. The hazard cause identification routine 700 begins at block 702.

At block 704, hazard data is obtained. The hazard data may include historical and/or current hazard data.

At block 706, a geographic map is annotated to indicate a location at which a hazard occurred. For example, the geographic map may correspond to a geographic location or area selected by a user device 102 via a user interface.

At block 708, a portion of the geographic map at which the hazard occurred and satisfied a condition is identified. For example, the hazard may satisfy the condition if a characteristic of the hazard exceeds a threshold value. The portion of the geographic map may include one or more pixels of the geographic may that correspond to a location at which the hazard occurred and satisfied the condition.

At block 710, the identified portion is applied as an input to a trained machine learning model that outputs an identification of infrastructure in the identified portion. For example, the output may include an indication of one or more pixels in the identified portion depicting infrastructure and/or a type of infrastructure depicted.

At block 712, a determination is made that a cause of the hazard is the infrastructure identified in the identified portion of the geographic map. For example, the determination may be made because the identified infrastructure is within a threshold distance of the hazard and/or because the identified infrastructure is of a type that is known to cause certain physical events to occur that can lead to the hazard (e.g., the identified infrastructure is a tower that attracts lightning strikes, the identified infrastructure is a transmission line that can spark wildfires, the identified infrastructure is a dam that can overflow and cause flooding, etc.). After the determination is made, the hazard cause identification routine 700 ends, as shown at block 714.

While the present application describes the hazard visualization system 120 as predicting a future hazard or identifying infrastructure that may be causing a current or historical hazard, this is not meant to be limiting. The operations described herein as being performed by the hazard visualization system 120 can be combined or interchanged to enhance the prediction or identification process. For example, the hazard visualization system 120 can identify infrastructure using the infrastructure identification artificial intelligence model. The hazard visualization system 120 can then use the output of the infrastructure identification artificial intelligence model and an output of the hazard prediction artificial intelligence model to determine location(s) at which a predicted hazard may impact identified infrastructure.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to submit claims, view captured images, set flight path parameters, modify a flight path during flight, view estimated repair costs and/or submitted bids, and/or select a bid. A user device 102 can be operated by a property owner, a claims adjuster, a contractor, and/or similar personnel.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In further embodiments, the hazard visualization system 120 can generate a flight path that travels to and/or through an area at which a hazard is predicted to occur and/or a location at which a hazard has occurred and instruct an aerial vehicle (e.g., an unmanned aerial vehicle, a manned aerial vehicle, etc.) to fly according to the flight path and capture image(s) and/or video(s) during flight of an area below the aerial vehicle and/or to resolve issues at at least one point within the flight path. The hazard visualization system 120 can generate the flight path automatically or in response to a user request provided via the user interfaces 400 or 500. For example, the generated flight path may include flight path parameters that are communicated to the aerial vehicle. The flight path parameters may include a flight path (e.g., one or more geographic coordinates, waypoints, flight length, flight time, speed, altitude, etc.), a shooting angle (e.g., an angle at which one or more cameras is positioned to capture images), camera resolution, and/or the like. The hazard visualization system 120 can transmit instructions to various components of the aerial vehicle to cause the aerial vehicle to take off from a current location, follow a certain flight path, instruct the camera(s) to capture images at the appropriate time and at the appropriate angle, and land once the flight is complete. Commercially available drones and associated code may provide such features. In some embodiments, the hazard visualization system 120 can transmit updated flight path parameters to the aerial vehicle while the aerial vehicle is in flight. When updated flight path parameters are received in flight, the aerial vehicle can adjust flight according to the updated flight path parameters.

The hazard visualization system 120 may further include instructions that, when executed, cause the aerial vehicle to deviate from the selected flight path at the instruction of a user (e.g., via the user interfaces 400 and/or 500) and/or automatically. For example, the aerial vehicle can transmit captured images in real-time (e.g., as the images are captured) to the hazard visualization system 120, user device 102, and/or hazard response system 170. The hazard visualization system 120 may provide one or more user devices 102 and/or hazard response systems 170 with access to the captured images as they are received during a flight. For example, the hazard visualization system 120 may generate user interface data that is transmitted to a user device 102 and/or hazard response system 170 and that causes the user device 102 and/or hazard response system 170 to display a user interface (e.g., user interface 400 or 500) showing the images as the images are captured by the one or more cameras. For example, the image(s) and/or video(s) captured by the camera(s) can be displayed in a new window, tab, panel, etc. in the user interface 400 or 500 and may or may not be depicted within a separate layer than the other layers depicted therein. A user viewing the user interface and captured images or videos may notice an object of interest and can use controls provided by the user interface 400 or 500 to transmit instructions to the aerial vehicle via the hazard visualization system 120 that causes the aerial vehicle to return to the location where the object of interest was noticed.

Not only can the aerial vehicle be instructed to capture images or videos, the hazard visualization system 120 and/or the user via the user interface 400 or 500 can instruct the aerial vehicle to perform a repair, to resolve damage caused by a hazard, to provide alerts or notifications to persons that may be located therein, and/or the like. As an illustrative example, based on the images or videos captured by the aerial vehicle and displayed in the user interface 400 or 500 and/or based on other information received by the user, the user may be aware of a fire that occurred due to a wildfire or lightning strike. The user can instruct the aerial vehicle via the user interface 400 or 500 to drop water on the location of the fire (e.g., the aerial vehicle can automatically detect the location of the fire or the user can identify the location of the fire based on images/videos and instruct the aerial vehicle to fly to that location to drop the water). Similarly, the aerial vehicle can be a medical vehicle that provides medical services to one or more persons at the location (e.g., drops medical equipment at a site, performs a surgical operation, stabilizes a person's injury, etc.), the aerial vehicle can drop a protective layer over equipment at a site to protect the equipment from a hazard, the aerial vehicle can pull equipment or other infrastructure above a water level if submerged, and/or the like. Thus, the user can use the user interface 400 or 500 to control an aerial vehicle (e.g., indirectly via the hazard visualization system 120) to capture images, to capture videos, and/to perform other services to mitigate the effects of a hazard.

In further embodiments, the hazard visualization system 120 may be in communication with one or more computing systems that host a social media site or application. A user device 102 operated by a user may be running a social media application in which the user has enabled location services and in which the user can post information, such as text, images, videos, etc. With permission from the user, the hazard visualization system 120 can obtain a user's location and/or social media postings from the social media site or application's computing system(s) and cause the user interface 400 or 500 to display some or all of this information in a separate layer (or new window, tab, panel, etc.). The hazard visualization system 120 may also have the ability to communicate with the user via the user device 102 and the social media site or application's computing system(s). Thus, the user interface 400 or 500 can display text postings, image(s), and/or video(s) from one or more users that may be located within a geographic area of interest depicted in the window 410 or 510 to provide a user viewing the user interface 400 or 500 with more information on what is occurring at the geographic area. Similarly, the hazard visualization system 120 can generate an alert or notification and transmit the alert or notification to the user via the social media site or application's computing system(s) and/or the user's user device 102 if the hazard visualization system 120 determines that the user is located at a location in which a hazard is predicted to occur and/or the user is located at a location in which a hazard has occurred and/or may be caused by certain equipment or other infrastructure so that the user can be warned of any danger. In addition, the hazard visualization system 120 can use the location services offered by the social media site or application to estimate the number of people that may be located in a given location, which can aid the hazard visualization system 120 (e.g., hazard alert generator 125) in determining whether to generate an alert or notification in the first place in a manner as described above.

In further embodiments, the hazard visualization system 120 can obtain real-time information on the location of emergency response teams, such as police officers, fire personnel, medical personnel, etc., and cause the real-time information to be displayed in the user interface 400 or 500. The hazard visualization system 120 may further estimate a time it may take for such emergency response teams to arrive at an area at which a hazard occurred and/or at which a hazard is predicted to occur (such as at an identified intersection) and indicate this time in the user interface 400 or 500.

In further embodiments, the hazard visualization system 120 can cause a user device 102 to display the user interface 400 or 500 as an augmented reality view. For example, the user device 102 may be located at a geographic location that falls within the geographic area depicted in the window 410 or 510. In response, the hazard visualization system 120 can obtain image(s) or video(s) captured by the user device 102 at the location, and can modify the image(s) or video(s) to include one or more layers showing how a predicted hazard may affect the site and/or what the site looked like before a hazard occurred, in a manner as described above.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A hazard visualization system for identifying a cause of a hazard, the hazard visualization system comprising:
    memory storing computer-executable instructions; and
    a hardware processor in communication with the memory, wherein the computer-executable instructions, when executed by the hardware processor, cause the hardware processor to:
        obtain hazard data;
        annotate a geographic map to indicate a location at which the hazard occurred using the hazard data;
        identify a portion of the geographic map at which the hazard occurred and satisfied a condition;
        apply the identified portion of the geographic map as an input to a trained machine learning model, wherein application of the identified portion of the geographic map as the input to the trained machine learning model causes the trained machine learning model to output an identification of a location of infrastructure in the identified portion of the geographic map; and
        determine that a cause of the hazard is the infrastructure identified in the identified portion of the geographic map.

2. The hazard visualization system of claim 1, wherein a geographic image depicts the geographic map, and wherein the identified portion of the geographic map comprises one or more pixels of the geographic image.

3. The hazard visualization system of claim 2, wherein the computer-executable instructions, when executed, further cause the hardware processor to apply the one or more pixels of the geographic image as the input to the trained machine learning model, wherein application of the one or more pixels of the geographic image as the input to the trained machine learning model causes the trained machine learning model to output an identification of one or more second pixels of the geographic image that depict the infrastructure.

4. The hazard visualization system of claim 1, wherein the computer-executable instructions, when executed, further cause the hardware processor to:
    obtain a plurality of geographic images each annotated to indicate a location of infrastructure; and
    train a machine learning model to identify infrastructure using the plurality of geographic images to form the trained machine learning model.

5. The hazard visualization system of claim 4, wherein a first geographic image in the plurality of geographic images comprises a pixel marked to indicate that the pixel depicts a first type of the infrastructure.

6. The hazard visualization system of claim 1, wherein the computer-executable instructions, when executed, further cause the hardware processor to:
    determine that the location of the infrastructure identified in the identified portion of the geographic map is within a threshold distance of the location at which the hazard occurred; and
    determine that the infrastructure identified in the identified portion of the geographic map caused the hazard in response to the determination that the location of the infrastructure identified in the identified portion of the geographic map is within the threshold distance of the location at which the hazard occurred.

7. The hazard visualization system of claim 6, wherein the condition comprises that the hazard occurred a threshold number of times within a first time period.

8. The hazard visualization system of claim 7, wherein the computer-executable instructions, when executed, further cause the hardware processor to determine that the infrastructure identified in the identified portion of the geographic map caused the hazard to occur the threshold number of times within the first time period in response to the determination that the location of the infrastructure identified in the identified portion of the geographic map is within the threshold distance of the location at which the hazard occurred.

9. The hazard visualization system of claim 1, wherein the computer-executable instructions, when executed, further cause the hardware processor to:
    generate user interface data that, when processed by a user device, causes the user device to display a user interface that depicts the annotated geographic map, the location of the infrastructure identified in the identified portion of the geographic map, and a location of other infrastructure; and
    transmit the user interface data to the user device.

10. The hazard visualization system of claim 1, wherein the user interface depicts a map file comprising a first layer, a second layer, and a third layer, wherein the first layer comprises the annotated geographic map, wherein the second layer comprises the location of the infrastructure identified in the identified portion of the geographic map, and wherein the third layer comprises the location of the other infrastructure.

11. The hazard visualization system of claim 1, wherein the infrastructure comprises one of a radio tower, a transmission line, a pipeline, water mains, a transformer, or a light pole.

12. The hazard visualization system of claim 1, wherein the hazard comprises one of a hail event, a wind event, a flood, storm surge, a lightning strike, a tornado, a hurricane, an earthquakes, a mud slide, or a wildfire.

13. A computer-implemented method for identifying a cause of a hazard, the computer-implemented method comprising:
    as implemented by one or more computing devices configured with specific computer-executable instructions, obtaining hazard data;

annotating a geographic map to indicate a location at which the hazard occurred using the hazard data;

identifying a portion of the geographic map at which the hazard occurred and satisfied a condition;

applying the identified portion of the geographic map as an input to a trained machine learning model, wherein application of the identified portion of the geographic map as the input to the trained machine learning model causes the trained machine learning model to output an identification of a location of infrastructure in the identified portion of the geographic map; and determining that a cause of the hazard is the infrastructure identified in the identified portion of the geographic map.

14. The computer-implemented method of claim 13, further comprising:

obtaining a plurality of geographic images each annotated to indicate a location of infrastructure; and training a machine learning model to identify infrastructure using the plurality of geographic images to form the trained machine learning model.

15. The computer-implemented method of claim 14, wherein a first geographic image in the plurality of geographic images comprises a pixel marked to indicate that the pixel depicts a first type of the infrastructure.

16. The computer-implemented method of claim 13, wherein determining that a cause of the hazard is the infrastructure identified in the identified portion of the geographic map further comprises:

determining that the location of the infrastructure identified in the identified portion of the geographic map is within a threshold distance of the location at which the hazard occurred; and determining that the infrastructure identified in the identified portion of the geographic map caused the hazard in response to the determination that the location of the infrastructure identified in the identified portion of the geographic map is within the threshold distance of the location at which the hazard occurred.

17. The computer-implemented method of claim 13, further comprising:

generating user interface data that, when processed by a user device, causes the user device to display a user interface that depicts the annotated geographic map, the location of the infrastructure identified in the identified portion of the geographic map, and a location of other infrastructure; and transmitting the user interface data to the user device.

18. Non-transitory, computer-readable storage media comprising computer-executable instructions for identifying a cause of a hazard, wherein the computer-executable instructions, when executed by a computer system, cause the computer system to:

obtain hazard data;

annotate a geographic map to indicate a location at which the hazard occurred using the hazard data;

identify a portion of the geographic map at which the hazard occurred and satisfied a condition;

apply the identified portion of the geographic map as an input to a trained machine learning model, wherein application of the identified portion of the geographic map as the input to the trained machine learning model causes the trained machine learning model to output an identification of a location of infrastructure in the identified portion of the geographic map; and determine that a cause of the hazard is the infrastructure identified in the identified portion of the geographic map.

19. The non-transitory, computer-readable storage media of claim 18, wherein the computer-executable instructions further cause the computer system to:

obtain a plurality of geographic images each annotated to indicate a location of infrastructure; and train a machine learning model to identify infrastructure using the plurality of geographic images to form the trained machine learning model.

20. The non-transitory, computer-readable storage media of claim 18, wherein the computer-executable instructions further cause the computer system to:

generate user interface data that, when processed by a user device, causes the user device to display a user interface that depicts the annotated geographic map, the location of the infrastructure identified in the identified portion of the geographic map, and a location of other infrastructure; and transmit the user interface data to the user device.

* * * * *